US007788398B2

(12) United States Patent
Chapweske et al.

(10) Patent No.: US 7,788,398 B2
(45) Date of Patent: Aug. 31, 2010

(54) MEDIA PLAYER PLUG-IN INSTALLATION TECHNIQUES

(75) Inventors: Justin F. Chapweske, Fridley, MN (US);
Ryan Brase, Minneapolis, MN (US);
John Riske, Minneapolis, MN (US)

(73) Assignee: Swarmcast, Inc., Minneapolis, MN (US)

( * ) Notice: Subject to any disclaimer, the term of this patent is extended or adjusted under 35 U.S.C. 154(b) by 194 days.

(21) Appl. No.: 12/187,472

(22) Filed: Aug. 7, 2008

(65) Prior Publication Data
US 2009/0063699 A1 Mar. 5, 2009

Related U.S. Application Data

(60) Provisional application No. 60/992,471, filed on Dec. 5, 2007, provisional application No. 60/981,164, filed on Oct. 19, 2007, provisional application No. 60/994,347, filed on Sep. 19, 2007, provisional application No. 60/964,010, filed on Aug. 8, 2007.

(51) Int. Cl.
*G06F 15/16* (2006.01)
(52) U.S. Cl. .................. 709/233; 709/203; 709/231; 725/37; 725/105; 725/143
(58) Field of Classification Search ........... 709/203, 709/231, 233; 725/37, 105, 143
See application file for complete search history.

(56) References Cited

U.S. PATENT DOCUMENTS

| 5,822,537 A * | 10/1998 | Katseff et al. ........... 709/231 |
| 5,953,506 A * | 9/1999 | Kalra et al. ............ 709/231 |
| 7,069,014 B1 * | 6/2006 | Thenthiruperai et al. . 455/452.2 |
| 7,185,082 B1 * | 2/2007 | del Val et al. ........... 709/224 |

(Continued)

FOREIGN PATENT DOCUMENTS

EP    0 911 728 A1    4/1999

(Continued)

OTHER PUBLICATIONS

Invitation to Pay Additional Fees and, Where Applicable, Protest Fee and Annex to the Invitation to Pay Additional Fees entitled "Communication Relating to the Results of the Partial International Search" mailed Feb. 12, 2009 for corresponding Application No. PCT/US2008/009489, (5 pages).

(Continued)

*Primary Examiner*—Michael Won
(74) *Attorney, Agent, or Firm*—Shumaker & Sieffert, P.A.

(57) ABSTRACT

In general, the invention is directed to techniques of distributing media player plug-in software. As described herein, default media player software may cause a client device to begin receiving and presenting media data in a media object. During the presentation of the media data, the client device may identify an occurrence of a viewing event in the presentation of the media data. When this occurs, the client device automatically prompts the user of the client device to decide whether to install a media player plug-in module that enables the client device to overcome the viewing event. If the user decides to install the media player plug-in module, the client device automatically downloads and installs the media player plug-in module. Subsequently, the media player plug-in module causes the client device to receive the additional media data.

19 Claims, 23 Drawing Sheets

U.S. PATENT DOCUMENTS

| | | | | |
|---|---|---|---|---|
| 2002/0161909 | A1* | 10/2002 | White | 709/231 |
| 2003/0067872 | A1 | 4/2003 | Harrell et al. | |
| 2004/0267940 | A1* | 12/2004 | Dideriksen et al. | 709/228 |
| 2005/0165849 | A1* | 7/2005 | Moradi et al. | 707/104.1 |
| 2008/0140720 | A1* | 6/2008 | Six et al. | 707/104.1 |
| 2009/0180430 | A1* | 7/2009 | Fadell | 370/329 |

FOREIGN PATENT DOCUMENTS

| | | |
|---|---|---|
| EP | 1 605 460 A1 | 12/2005 |
| EP | 1 848 214 A1 | 10/2007 |
| GB | 2 374 746 A | 10/2002 |
| JP | 2003-067284 A | 3/2003 |

OTHER PUBLICATIONS

Notification of Transmittal of the International Search Report and the Written Opinion of the International Searching Authority, or the Declaration for corresponding patent applicaion No. PCT/US2008/009489, mailed May 27, 2009, 16 pages.

* cited by examiner

MEDIA PLAYER PLUG-IN INSTALLATION TECHNIQUES

This application claims priority from U.S. Provisional Application Ser. No. 60/964,010 filed Aug. 8, 2007, U.S. Provisional Application Ser. No. 60/994,347 filed Sep. 19, 2007, U.S. Provisional Application Ser. No. 60/981,164 filed Oct. 19, 2007, and U.S. Provisional Application Ser. No. 60/992,471 filed Dec. 5, 2007, the entire contents of each is incorporated herein by reference.

TECHNICAL FIELD

The invention relates to computer networks and, in particular, to the use of media players on computer devices.

BACKGROUND

The World Wide Web allows a user to access a resource (e.g., browse to a web page) that contains embedded media. Such embedded media may include audio media, video media, photographs, drawings, and so on. Streaming technology enables a web browser to start presenting the media before the web browser finishes downloading all of the media. For example, a web browser may begin playing a video stream before the web browser downloads all of the video data. However, it is often the case that a user of the client device must seek out, download, and install special media player software before the web browser may begin playing the video stream.

SUMMARY

In general, the invention is directed to techniques of distributing media player plug-in software. As described herein, default media player software may cause a client device to begin receiving and presenting media data in a media object. During the presentation of the media data, the client device may identify an occurrence of a playback stall in the presentation of the media data. When this occurs, the client device automatically prompts the user of the client device to decide whether to install a media player plug-in module that enables the client device to receive additional media data in the media object at a faster rate. If the user decides to install the media player plug-in module, the client device automatically downloads and installs the media player plug-in module. Subsequently, the media player plug-in module causes the client device to receive the additional media data at the faster rate.

In one example, a method comprises receiving, with a client device, initial media data in a media object at a first rate. The method also comprises presenting, with the client device, the initial media data in the media object. In addition, the method comprises automatically identifying a current or future occurrence of a playback stall in the presentation of the initial media data. Furthermore, the method comprises presenting, when the occurrence of the playback stall has been identified, a prompt that requests a user of the client device to decide whether to install on the client device a software module that enables the client device to receive additional media data in the media object at a second rate, wherein the second rate is different than the first rate. The method also comprises installing the software module when the user, in response to the prompt, decides to install the software module. In addition, the method comprises using the software module to receive, with the client device, the additional media data in the media object at the second rate. The method also comprises presenting the additional media in the media object.

In another example, a device comprises a network interface that receives initial media data in a media object at a first rate. The device also comprises a media playback module that causes the device to present the initial media data in the media object. Furthermore, the device comprises a stall detection module that automatically identifies a current or future occurrence of a playback stall in the presentation of the initial media data. In addition, the device comprises a installation determination module that presents, when the stall detection module identifies the occurrence of the playback stall during the presentation of the initial media data, a prompt that requests a user of the device to decide whether to install on the device a software module that enables the device to receive additional media data in the media object at a second rate, wherein the second rate is different than the first rate. The device also comprises a plug-in download module that installs the software module when the user, in response to the prompt, decides to install the software module. When installed on the device, the software module causes the network interface to receive the additional media data in the media object at the second rate. The media playback module causes the device to present the additional media in the media object.

In another example, a computer-readable medium comprises instructions. When executed, the instructions cause a programmable processor of a device to cause the device to receive initial media data in a media object at a first rate. The instructions also cause the processor to cause the device to present the initial media data in the media object. Furthermore, the instructions cause the processor to automatically identify a current or future occurrence of a playback stall of the presentation of the initial media data. In addition, the instructions cause the programmable processor to cause the device to present, when the programmable processor has identified the occurrence of the playback stall, a prompt that requests a user of the device to decide whether to install on the device a software module that enables the device to receive additional media data in the media object at a second rate, wherein the second rate is different than the first rate. The instructions also cause the programmable processor to install the software module when the user, in response to the prompt, decides to install the software module. In addition, the instructions cause the programmable processor to cause the device to start executing the software module. When executed, the software module causes device to receive the additional media data in the media object at the second rate. The instructions also cause the programmable processor to cause the device to present the additional media in the media object.

In another example, a method comprises receiving, with a client device, initial media data in a media object at a first rate. The method also comprises presenting, with the client device, the initial media data in the media object. In addition, the method comprises determining whether a user of the client device has elected to view subsequent media data in the media object in a full-screen mode. Furthermore, the method comprises presenting, when the user of the client device has elected to view the subsequent media data in the media object in the full-screen mode, a prompt that requests the user of the client device to decide whether to install a software module on the client device. The method also comprises installing the software module when the user, in response to the prompt, decides to install the software module. In addition, the method comprises using the software module to receive, with the client device, the subsequent media data in the media object at a second rate, wherein the second rate is different than the first rate. The method also comprises presenting the subsequent media data in the media object in the full-screen mode.

In another example, a method comprises receiving, with a client device, initial media data in an initial version of a media object. The method also comprises presenting, with the client device, the initial media data in the media object. Furthermore, the method comprises determining whether a user of the client device has elected to view subsequent media data in the media object in a full-screen mode. Moreover, the method comprises presenting, when the user of the client device has elected to view the subsequent media data in the media object in the full-screen mode, a prompt that requests the user of the client device to decide whether to install a software module on the client device. The method also comprises installing the software module when the user, in response to the prompt, decides to install the software module. In addition, the method comprises identifying, with the software module, a bandwidth of a network connection that connects the client device to a network. Furthermore, the method comprises identifying, with the software module, a set of alternate versions of the media object that are available to be downloaded from the network. The method also comprises identifying, with the software module, a nominee version of the media object. The nominee version of the media object is a one of the alternate versions of the media object that has higher quality than other ones of the alternate versions of the media object that are downloadable to the client device without a playback stall due to the bandwidth of the network connection. In addition, the method comprises using the software module to receive, with the client device, subsequent media data in the nominee version of the media object. The method also comprises presenting the subsequent media data in the nominee version of the media object in full-screen mode.

In another example, a method comprises receiving, with a client device, initial media data in an initial version of a media object. The method also comprises presenting, with the client device, the initial media data. Furthermore, the method comprises automatically identifying an occurrence of a playback stall in the presentation of the initial media data. In addition, the method comprises presenting, when the occurrence of the playback stall has been identified, a prompt that requests a user of the client device to decide whether to install a software module on the client device. Moreover, the method comprises installing the software module when the user, in response to the prompt, decides to install the software module. In addition, the method comprises identifying, with the software module, a bandwidth of a network connection that connects the client device to a network. Furthermore, the method comprises identifying, with the software module, a set of alternate versions of the media object that are available to be downloaded from the network. The method also comprises identifying, with the software module, a nominee version of the media object. The nominee version of the media object is a one of the alternate versions of the media object that has higher quality than other ones of the alternate versions of the media object that are downloadable to the client device without a playback stall due to the bandwidth of the network connection. In addition, the method comprises using the software module to receive, with the client device, subsequent media data in the nominee version of the media object. Moreover, the method comprises presenting the subsequent media data in the nominee version of the media object in full-screen mode.

In another example, a device comprises a network interface that receives initial media data in a media object at a first rate. The device also comprises a media playback module that causes the device to present the initial media data in the media object. In addition, the device comprises a full-screen activation module that determines whether a user of the device has elected to view subsequent media data in the media object in a full-screen mode. The device also comprises an installation determination module that presents, when the full-screen activation module determines that the user has elected to view the subsequent media data in the media object in the full-screen mode, a prompt that requests the user of the device to decide whether to install a software module on the device. Moreover, the device comprises a plug-in download module that installs the software module when the user, in response to the prompt, decides to install the software module. When installed on the device, the software module causes the network interface to receive the subsequent media data in the media object at a second rate, wherein the second rate is different than the first rate. The media playback module also causes the device to present the subsequent media data in the media object in the full-screen mode.

In another example, a device comprises a network interface that receives initial media data in an initial version of a media object. The device also comprises a media playback module that causes the device to present the initial media data. In addition, the device comprises a full-screen activation module that determines whether a user of the device has elected to view subsequent media data in the media object in a full-screen mode. Moreover, the device comprises an installation determination module that presents, when the full-screen activation module determines that the user of the device has elected to view the subsequent media data in the full-screen mode, a prompt that requests the user of the device to decide whether to install a software module on the device. The device also comprises a plug-in download module that installs the software module when the user, in response to the prompt, decides to install the software module. When installed on the device, the software module causes the device to (i) identify a bandwidth of a network connection that connects the client device to a network, (ii) identify a set of alternate versions of the media object that are available to be downloaded from the network, (iii) identify a nominee version of the media object, wherein the nominee version of the media object is a one of the alternate versions of the media object that has higher quality than other ones of the alternate versions of the media object that are downloadable to the device without a playback stall due to the bandwidth of the network connection; and (iv) receive subsequent media data in the nominee version of the media object. The media playback module causes the device to present the subsequent media data in the nominee version of the media object in the full-screen mode.

In another example, a device comprises a network interface that receives initial media data in an initial version of a media object. The device also comprises a media playback module that causes the device to present the initial media data. In addition, the device comprises a stall detection module that automatically identifies a current or future occurrence of a playback stall in the presentation of the initial media data. Moreover, the device comprises an installation determination module that presents, when the stall detection module identifies the occurrence of the playback stall during the presentation of the initial media data, a prompt that requests a user of the device to decide whether to install a software module on the device. In addition, the device comprises a plug-in download module that installs the software module when the user, in response to the prompt, decides to install the software module. When installed on the device, the software module causes the device to: (i) identify a bandwidth of a network connection that connects the client device to a network, (ii)

identify a set of alternate versions of the media object that are available to be downloaded from the network, (iii) identify a nominee version of the media object, wherein the nominee version of the media object is a one of the alternate versions of the media object that has higher quality than other ones of the alternate versions of the media object that are downloadable to the client device without a playback stall due to the bandwidth of the network connection; and (iv) receive subsequent media data in the nominee version of the media object. The media playback module causes the device to present the subsequent media data in the nominee version of the media object.

In another example, a computer-readable medium comprises instructions. When executed by one or more programmable processors of a client device, the instructions cause the one or more programmable processors to receive initial media data in a media object at a first rate. The instructions also cause the one or more programmable processors to present the initial media data in the media object. Furthermore, the instructions cause the one or more programmable processors to determine whether a user of the client device has elected to view subsequent media data in the media object in a full-screen mode. In addition, the instructions cause the one or more programmable processors to present, when the user has elected to view the media data in the media object in the full-screen mode, a prompt that requests the user of the client device to decide whether to install a software module on the client device. Moreover, the instructions cause the one or more programmable processors to install the software module when the user, in response to the prompt, decides to install the software module. In addition, the instructions cause the one or more programmable processors to use the software module to receive subsequent media data in the media object at a second rate, wherein the second rate is different than the first rate. The instructions also cause the one or more programmable processors to present the subsequent media data in the media object in the full-screen mode.

In another example, a computer-readable medium comprises instructions. When executed by one or more programmable processors of a client device, the instructions cause the one or more programmable processors to receive initial media data in an initial version of a media object. In addition, the instructions cause the one or more programmable processors present the initial media data in the media object. The instructions also cause the one or more programmable processors to determine whether a user of the client device has elected to view subsequent media data in the media object in a full-screen mode. Furthermore, the instructions cause the one or more programmable processors to present, when the user of the client device has elected to view the media data in the media object in the full-screen mode, a prompt that requests the user of the client device to decide whether to install a software module on the client device. In addition, the instructions cause the one or more programmable processors to install the software module when the user, in response to the prompt, decides to install the software module. The instructions also cause the one or more programmable processors to identify, with the software module, a bandwidth of a network connection that connects the client device to a network. Moreover, the instructions cause the one or more programmable processors to identify, with the software module, a set of alternate versions of the media object that are available to be downloaded from the network. In addition, the instructions also cause the one or more programmable processors to identify, with the software module, a nominee version of the media object, wherein the nominee version of the media object is a one of the alternate versions of the media object that has higher quality than other ones of the alternate versions of the media object that are downloadable to the client device without a playback stall due to the bandwidth of the network connection. In addition, instructions also cause the one or more programmable processors to use the software module to receive, with the client device, subsequent media data in the nominee version of the media object. Furthermore, the instructions cause the one or more programmable processors to present the subsequent media data in the nominee version of the media object in full-screen mode.

In another example, a computer-readable medium comprises instructions. When executed by one or more programmable processors of a client device, the instructions cause the one or more programmable processors to receive initial media data in an initial version of a media object. The instructions also cause the one or more programmable processors to present the initial media data. In addition, the instructions cause the one or more programmable processors to automatically identify an occurrence of a playback stall in the presentation of the initial media data. Furthermore, the instructions cause the one or more programmable processors to present, when the occurrence of the playback stall has been identified, a prompt that requests a user of the client device to decide whether to install a software module on the client device. Moreover, the instructions cause the one or more programmable processors to install the software module when the user, in response to the prompt, decides to install the software module. In addition, the instructions cause the one or more programmable processors to identify, with the software module, a bandwidth of a network connection that connects the client device to a network. Furthermore, the instructions cause the one or more programmable processors to identify, with the software module, a set of alternate versions of the media object that are available to be downloaded from the network. The instructions also cause the one or more programmable processors to identify, with the software module, a nominee version of the media object. The nominee version of the media object is a one of the alternate versions of the media object that has higher quality than other ones of the alternate versions of the media object that are downloadable to the client device without a playback stall due to the bandwidth of the network connection. In addition, the instructions cause the one or more programmable processors to use the software module to receive, with the client device, subsequent media data in the nominee version of the media object. Furthermore, the instructions cause the one or more programmable processors to present the subsequent media data in the nominee version of the media object.

In another example, a method comprises receiving, with a client device, initial media data in a media object. The method also comprises presenting, with the client device, the initial media data. In addition, the method comprises determining, after presenting the initial media data, whether a user of the client device has instructed the client device to present media data associated with a point along a playback timeline of the media object that the client device has not yet received. Furthermore, the method comprises presenting, when the user has instructed the client device to present media data associated with a point along the playback timeline of the media object that the client device has not yet received, a prompt that requests the user to decide whether to install a software module on the client device. In addition, the method comprises installing the software module when the user, in response to the prompt, decides to install the software module. The method also comprises executing instructions of the software module. The instructions of the software module cause the client device to receive media data associated with the point along the playback timeline of the media object. In addition, the method comprises presenting the media data associated with the point along the playback timeline of the media object.

In another example, a device comprises a default media input module that causes the device to receive initial media data in a media object. The device also comprises a media playback module that causes the device to present the initial media data. In addition, the device comprises a skip-ahead detection module that determines, after the media playback module has caused the device to present the initial media data, whether a user of the device has instructed the device to present media data associated with a point along a playback timeline of the media object that the device has not yet received. Furthermore, the device comprises an installation determination module that presents, when the user has instructed the device to present media data associated with a point along the playback timeline of the media object that the device has not yet received, a prompt that requests the user to decide whether to install a software module on the device. In addition, the device comprises a plug-in download module that installs the software module when the user, in response to the prompt, decides to install the software module. The software module causes the device to receive the media data associated with the point along the playback timeline of the media object. The media presentation module causes the device to present the media data associated with the point along the playback timeline of the media object.

In another example, a computer-readable medium comprises instructions. When executed by one or more processors of a client device, the instructions cause the one or more processors to receive initial media data in a media object. The instructions also cause the one or more processors to present the initial media data. In addition, the instructions cause the one or more processors to determine, after presenting the initial media data, whether a user of the client device has instructed the client device to present media data associated with a point along a playback timeline of the media object that the client device has not yet received. Furthermore, the instructions cause the one or more processors to present, when the user has instructed the client device to present media data associated with a point along the playback timeline of the media object that the client device has not yet received, a prompt that requests the user to decide whether to install a software module on the client device. The instructions also cause the one or more processors to install the software module when the user, in response to the prompt, decides to install the software module. Furthermore, the instructions cause the one or more processors to execute instructions of the software module. The instructions of the software module cause the one or more processors to receive the media data associated with the point along the playback timeline of the media object. Furthermore, the instructions cause the one or more processors to present the media data associated with the point along the playback timeline of the media object.

In another example, a method comprises displaying media data units of a media object, via a media player. The method further comprises determining a viewing event while displaying the media data units via the media player. The viewing event comprises at least one of a playback stall of the media data units, a full-screen activation received from a user while displaying the media data units, a skip-ahead request, a dropping of frames of the media data units, a transfer rate of the media data units that is at least a defined threshold higher than a playback rate of the media data units, or an end of viewing event. The method further comprises presenting a prompt to download an executable software module in response to the determined event.

In another example, a client device comprises a network interface that downloads media data units of a media object, and a media player. The media player comprises a media display module that displays the media data units. The media player further comprises at least one of a stall detection and prediction module, a full screen activation module, a skip-ahead detection module, a frame drop detection module, a rate detection module, and an end of media detection module that determines a viewing event. The viewing event is at least one of a playback stall of the media data units, a full-screen activation received from a user while displaying the media data units, a skip-ahead request, a dropping of frames of the media data units, a transfer rate of the media data that is at least a defined threshold higher than a playback rate of the media data units, and an end of viewing event. The media player further comprises an installation determination module that causes the client device to prompt to download an executable software module in response to the determined event. While the media player displays the media data units, the stall detection and prediction module determines the occurrence of the playback stall, the full screen activation module determines a user's request for full-screen activation, the skip-ahead detection module determines the user's skip-ahead request. the frame drop detection module determines the dropping of frames of the media data units, the rate detection module determines that the transfer rate of the media data units is at least the defined threshold higher than the playback rate of the media data units, and the end of media detection module determines the end of viewing event.

In another example, the invention is directed to a computer readable storage medium. The computer readable storage medium comprises instructions that cause one or more processors to display media data units of a media object, via a media player. The instruction further cause one or more processors to determine a viewing event while displaying the media data units via the media player. The viewing event comprises at least one of a playback stall of the media data units, a full-screen activation received from a user while displaying the media data units, a skip-ahead request, a dropping of frames of the media data units, a transfer rate of the media data units that is at least a defined threshold higher than a playback rate of the media data units, or an end of viewing event. The instructions further cause the one or more processors to present a prompt to download an executable software module in response to the determined event.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a screen illustration showing an exemplary user interface in which a user is prompted to install a media player plug-in.

DETAILED DESCRIPTION

Figure 1:
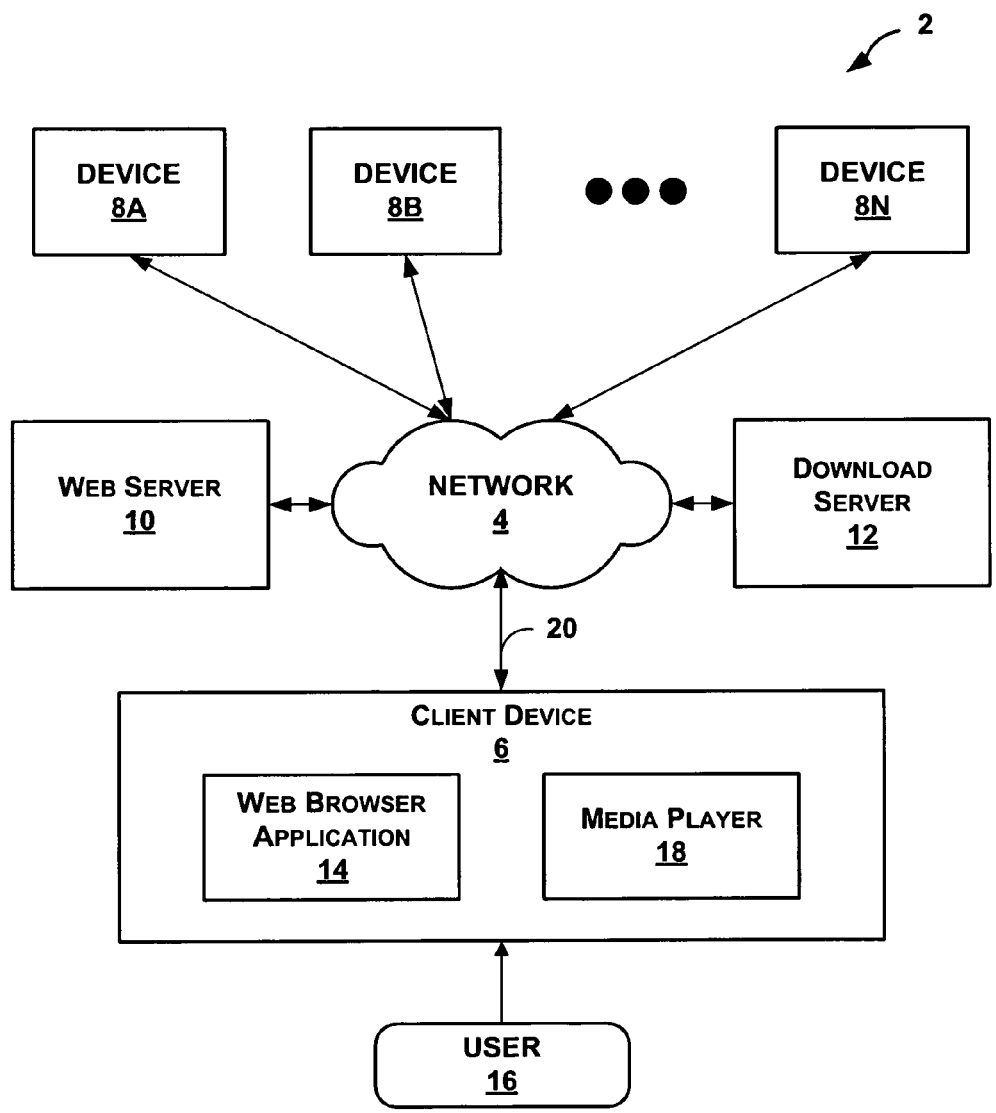
FIG. 1 is a block diagram illustrating an exemplary system.

FIG. 1 is a block diagram illustrating an exemplary system 2. As illustrated in the example of FIG. 1, system 2 includes a network 4. Network 4 may include or consist of a wide-area network such as the Internet, a local-area network (LAN), an enterprise network, or one or more other types of networks. Furthermore, network 4 may include wired and/or wireless links.

Several devices may be coupled to network 4. As illustrated in the example of FIG. 1, a network connection 20 connects client device 6 to network 4. In addition to client device 6, a set of devices 8A through 8N (collectively, "devices 8") are also coupled to network 4. Devices 8 may or may not be peer devices to client device 6. Moreover, some of devices 8 may be peer devices to client device 6 and some of device 8 might not be peer devices to client device 6. Client device 6 and devices 8 may be any of a variety of different types of network devices. For example, client device 6 or any of devices 8 may be personal computers, gaming platforms, laptop computers, mobile telephones, personal digital assistants, handheld computers, mainframe computers, personal media players, network televisions, network workstations, servers, devices integrated into vehicles, television set top boxes, or other types of network devices. Furthermore, a web server 10 and a download server 12 are coupled to network 4. Web server 10 and download server 12 may be any of several different types of network devices. For instance, web server 10 and/or download server 12 may be conventional web servers, specialized media servers, personal computers operating in a peer-to-peer fashion, or other types of network devices.

In the example of FIG. 1, a web browser application 14 executes on client device 6. A user 16 of client device 6 may request that web browser application 14 present a web page provided by web server 10. In response to the request from user 16, web browser application 14 may cause client device 6 to send a request to web server 10 via network 4. The request may be a Hypertext Transfer Protocol ("HTTP") request, a HTTP with Secure Sockets Layer ("HTTPS") request, or a request in another network protocol. In response to the request from web browser application 14, web server 10 may send to web browser application 14 a response that includes the requested web page. Upon receiving the web page, web browser application 14 may cause client device 6 to render and to present the web page.

The web page may include a media object is to be presented as part of the web page. For example, the web page may identify the media object using one or more Hypertext Markup Language ("HTML") tags. The media object may be audio data (e.g., a song, sound effect, musical composition, etc.), audio/video data (e.g., a movie, clip, animation, etc.), or other types of media. As illustrated in the example of FIG. 1, client device 6 may include a media player 18 that is capable of causing client device 6 to present the identified media object. For example, the identified media data may be a Flash Video playable by a Flash Video player available from Abode Systems Inc. of San Jose, Calif., a QuickTime video playable by a QuickTime video player available from Apple Computer of Cupertino, California, or otherwise.

In order to cause client device 6 to present the media object, media player 18 may cause client device 6 to output to web server 10 a request for media data units of the media object. As used in this disclosure, a media data unit ("MDU") may be one or more video frames, a set of audio samples, or a unit of another type of media data. In response to this request, web server 10 may send MDUs of the requested media object to client device 6. Web server 10 may send MDUs of the requested media object to client device 6 in a variety of ways. For example, web server 10 may use a media streaming protocol to send MDUs of the requested media object to client device 6. These media streaming protocols may include the Real-Time Streaming Protocol ("RTSP"), Real-Time Transport Protocol ("RTP"), Real-time Transport Control Protocol ("RTCP"), Real-Time Messaging Protocol ("RTMP"), Advanced Systems Format ("ASF"), Real Data Transport ("RDT"), Motion Pictures Experts Group ("MPEG)-2 transport stream, and other protocols. In another example, web server 10 may send MDUs of the requested media object to client device 6 as a progressive download via HTTP or another network protocol. During a progressive download, all of the MDUs in the requested media object may be stored to a hard disk of client device 6, but playback of the MDUs may begin before all of the MDUs in the requested media object have been stored to the hard disk of client device 6.

After client device 6 begins to receive the media object, media player 18 may cause client device 6 to begin presenting the media object. Media player 18 may cause client device 6 to begin presenting the media object within a media player window embedded within the web page, within a media player window that is separate from the web page, within a full-screen window, or in another type of window.

Due to a variety of factors, media player 18 may cause client device 6 to present MDUs in the media object at a playback rate that is greater than a rate at which client device 6 receives MDUs in the media object from network 4. As used in this disclosure, the term playback rate refers to the rate at which the MDUs need to be played back by client device 6. The MDUs are encoded for a certain playback rate and stored on web server 10. For example, media player 18 may cause client device 6 to present MDUs in the media object at a rate of 1.2 megabytes per second, i.e. media player 18 presents MDUs at a playback rate of 1.2 megabytes per second, while client device 6 receives MDUs in the media object from network 4 at a rate of 7 kilobytes per second. The factors that may cause media player 18 to cause client device 6 to present MDUs in the media object at a playback rate that is greater than a rate at which client device 6 receives MDUs, i.e. transfer rate in the media object may include network congestion in network 4, limited resources on web server 10, limited bandwidth in connections within network 4, limited resources on client device 6, network errors, and other factors. When media player 18 causes client device 6 to present MDUs in the media object at a playback rate that is greater than the rate at which client device 6 receives MDUs in the media object, a situation may occur in which the media object is not yet finished but client device 6 has not received enough MDUs to continue presenting MDUs in the media object. This disclosure refers to such a situation as a "playback stall." Playback stalls may be disruptive to the experience of user 16 because playback stalls are associated with interruptions in the presentation of the audio and/or video of the media object.

In order to reduce the frequency at which playback stalls occur, media player 18 automatically identifies occurrences of playback stalls in the presentation of the MDUs in the media object. In other words, media player 18 detects past or current occurrences of playback stalls in the presentation of the media object or predicts the occurrence of future playback stalls in the presentation of the media object. When media player 18 detects or predicts the occurrence of a playback stall in the presentation of the media object, media player 18 may determine whether the playback stall is attributable to a cause that may be remedied through the installation and use of a plug-in module that causes client device to receive MDUs in the media object at a faster rate. For example, if media player 18 determines that a playback stall is attributable to a network error (i.e., a network cable is unplugged, user 16 has disabled network connectivity, etc.), media player 18 may determine that the playback stall is not attributable to a cause that may be remedied through the installation and use of a plug-in module that causes client device 6 to receive MDUs in the media object at a faster rate. On the other hand, if media player 18 determines that the playback stall is attributable to the fact that client device 6 is simply receiving MDUs from web server 10 at a transfer rate that is less than the playback rate at which media player 18 is presenting the MDUs, media player 18 may determine that the playback stall is attributable to a cause that may be remedied through the installation and use of a plug-in module that causes client device 6 to receive MDUs in the media object at a faster rate, i.e. faster transfer rate.

If media player 18 determines that the playback stall is attributable to a cause that may be remedied through the installation and use of a plug-in module that causes client device 6 to receive MDUs in the media object at the faster transfer rate, media player 18 may cause client device 6 to determine whether this plug-in module is installed in media player 18. In some embodiments, the plug-in module may enable client device 6 to receive MDUs in the media object at a faster transfer rate. In some embodiments, the plug-in module may enable client device 6 to receive MDUs in the media object that are encoded for a lower playback rate. In these embodiments, the plug-in module does not affect the transfer rate, instead the plug-in module determines whether versions of the media object exist that are encoded for a playback rate that is less than or equal to the transfer rate. If the plug-in module is not already installed in media player 18, media player 18 may cause client device 6 to prompt user 16 to decide whether to download and install the plug-in module. For instance, media player 18 may cause client device 6 to present an alert window that prompts user 16 to decide whether to download and install the plug-in module. In the case where media player 18 is a Flash video player, the alert window may be a Flash object. If user 16 decides not to download and install the plug-in module, media player 18 may continue to cause client device 6 to receive MDUs in the media object as before.

However, if user 16 decides to download and install the plug-in module, media player 18 may cause client device 6 to perform a variety of different actions. In a first example, media player 18 may cause client device 6 to download an executable installation package from download server 12. After client device 6 downloads the installation package for the plug-in module, media player 18 may cause client device 6 to execute the installation package in order to install the plug-in module. In a second example, media player 18 may cause client device 6 to download and execute a trusted applet. This applet then downloads and installs the plug-in module. In a third example, media player 18 may cause client device 6 to use a plug-in installer mechanism to download and install the plug-in module. Such plug-in installer mechanisms are frequently built into web browser applications, media player applications, and other types of end-user software applications.

When client device 6 has installed the plug-in module, in some embodiments, the plug-in module may cause client device 6 to receive MDUs in the media object at a different transfer rate. In general, this different transfer rate is greater than the playback rate of the MDUs in the media object prior to the installation of the plug-in module. The plug-in module may cause client device 6 to receive MDUs in the media object at a faster transfer rate in a variety of ways. For example, the plug-in module may cause client device 6 to receive MDUs from one or more of devices 8 in addition to receiving MDUs from web server 10. In this manner, client device 6 concurrently receives MDUs from different locations allowing for an effective faster transfer rate. For instance, web server 10 may be able to deliver MDUs encoded for a playback rate of 10 kilobytes per second to client device 6 at a transfer rate of 6 kilobytes per second. In this instance, there may be a playback stall since the transfer rate is less than the playback rate. In some embodiments, the plug-in module may cause client device 6 to download from web server 10 and concurrently download from one or more devices 8, such as device 8A. In this example, device 8A may be able to deliver different MDUs encoded for a playback rate of 10 kilobytes per second to client device 6 at a transfer rate of 7 kilobytes per second. Hence, client device 6 may be able to receive MDUs at an effective transfer rate of 13 kilobytes (i.e., 0.13 megabytes) per second (6 kilobytes per second plus 7 kilobytes per second). In this example, there may not be a playback stall since the effective transfer rate of the MDUs is greater than the playback rate of the MDUs. In another example, the plug-in module may cause client device 6 to receive MDUs from one or more of devices 8 that is able to deliver MDUs to client device 6 at a transfer rate that is faster than the rate at which web server 10 is able to deliver MDUs to client device 6.

The plug-in module may use a variety of different technologies in order to cause client device 6 to receive MDUs in the media object at the faster transfer rate. In a first example, the plug-in module may enable media player 18 to receive MDUs in the media object using a peer-to-peer technology. In a second example, the plug-in module may cause client device 6 to use "swarming" technology provided by Swarmcast, Inc. of Minneapolis, Minn. In general, the plug-in module causes client device 6 to initiate a "swarming" download by sending a request to a server that is an initial source of the higher-quality version of the media file. For instance, the plug-in module may cause client device 6 to send a request to web server 10. In response to the request, web server 10 may send a first set of MDUs in the media object to client device 6. However, rather than sending all MDUs in the entire media object to client device 6, web server 10 breaks the media object into small sections and begins sending some of these sections to client device 6. Meanwhile, one of devices 8 (e.g., device 8A) may begin downloading the same media object from web server 10. Web server 10 may then send to client device 8A MDUs of the media object, but MDUs that are different than the MDUs that web server 10 is sending to client device 6. In addition, the plug-in module may cause client device 6 to begin sending to client device 8A some of the MDUs that client device 6 has received. Furthermore, client device 8A may begin sending to client device 6 some of the MDUs in the media object that client device 8A has already received. In this way, both client device 6 and client device 8A may receive MDUs in the media object more quickly than if client device 6 or client device 8A were receiving MDUs of the media object exclusively from web server 10.

Otherwise stated, "swarming" may be described as a method of distributing data. This method comprises sending a first portion of the data to a first computer and sending a second portion of the data to a second computer, where the second portion includes at least some of the data that is not included in the first portion. Then, after sending to the first computer and the second computer has commenced, sending a request for the data from a requesting computer to a targeted computer system. In addition, the method comprises accessing a look-up list to identify at least the first computer and the second computer as computers that have previously requested the data. Moreover, the method comprises sending requests to the first computer and the second computer before the first computer or the second computer have received all of the data. Furthermore, the method includes sending the first portion of the data from the first computer to the requesting computer and sending the second portion of the data from the second computer to the requesting computer. The method also comprises receiving, with the requesting computer, the first portion of the data from the first computer and receiving, with the requesting computer, the second portion of the data from the second computer. In addition, the method comprises saving the data in memory of the requesting computer to recreate the requested data. This process of downloading files using "swarming" technology is described in greater detail in U.S. Pat. No. 7,277,950 entitled "APPARATUS, METHOD AND SYSTEM FOR AN ACKNOWLEDGEMENT INDEPENDENT EQUALIZED DATA PACKET TRANSFER MECHANISM OVER A PEER TO PEER NETWORK," the entire content of which is hereby incorporated by reference.

Other exemplary peer-to-peer technologies include receiving data over multiple channels in parallel with data order prioritization. A more complete description of this technology is described in co-pending U.S. patent application Ser. No. 10/788,695 entitled "PARALLEL DATA TRANSFER OVER MULTIPLE CHANNELS WITH DATA ORDER PRIORITIZATION," the entire content of which is hereby incorporated by reference.

As described above, to avoid a playback stall, in some embodiments, the plug-in module causes client device 6 to download MDUs of the media object at a faster effective transfer rate. In some embodiments, instead of causing client device 6 to download MDUs at a faster effective transfer rate, the plug-in module causes client device 6 to download MDUs at are encoded for a playback rate that is less than the transfer rate. Keeping with the example above, client device 6 downloads MDUs from web server 10 that are encoded for a 10 kilobytes per second playback rate at a transfer rate of 7 kilobytes per second. This may cause a playback stall. In this instance, the plug-in module may determine whether there are versions of MDUs that contain substantially the same content, but are encoded for different playback rates. For example, there are three versions of MDUs each containing the same content. A first version is encoded for a playback rate of 2 kilobytes per second, a second version is encoded for a playback rate of 5 kilobytes per second, and the third version is encoded for a playback rate of 10 kilobytes per second. In this instance, the plug-in module may select either the first or second versions of MDUs, since their playback rate (2 kilobytes per second and 5 kilobytes per second) is less than the transfer rate between network 4 and client device 6 (7 kilobytes per second). After selecting the appropriate version, the plug-in module causes client device 6 to display the new selected version of MDUs. This may avoid a playback stall since client device 6 is displaying the MDUs at a rate that is less than the rate at which it is receiving the MDUs.

In addition to causing client device 6 to receive MDUs in the media object at the faster transfer rate, the plug-in module may perform other operations or provide other advantages. In a first example, the plug-in module may improve the reliability at which client device 6 receives MDUs in the media object. In this first example, the plug-in module may improve the reliability at which client device 6 receives MDUs in the media object by causing client device 6 to failover to another server (e.g., one of devices 8) if client device 6 stops receiving MDUs in the media object from web server 10. Furthermore, in this first example, the plug-in module may improve the reliability at which client device 6 receives MDUs in the media object by causing client device 6 to repeatedly output "retry" messages on network 4 that request that web server 10 provide MDUs in the media object. In a second example, because the plug-in module causes client device 6 to receive MDUs in the media object at a faster transfer rate, there are likely to be fewer playback stalls when media player 18 presents the MDUs of the media object. In a third example, the plug-in module may perform stream error correction techniques. These stream error correction techniques may correct errors introduced during transmission from web server 10 or devices 8 to client device 6.

Furthermore, it should be appreciated that a variety of events, other than a playback stall, may cause media player 18 to prompt user 16 to install the plug-in module. These events may, for example, include detection of dropped packets, detection of corrupt data, an instruction from user 16 to present the media object in full-screen mode, an instruction from user 16 to present the media object in a smaller aspect ratio mode, instruction from user 16 to jump to the middle of the media object, detection that a higher-quality version of the media object is available when there is sufficient bandwidth to receive the higher-quality version of the media object, and other events. User 16 may also be prompted to install the plug-in module after media player 18 finishes displaying the media object. The variety of events described above are referred to as viewing events herein. The viewing events that may occur while the media player displays media data units of the media object may be categorized as one of a playback stall of the media data units, a full-screen activation received from user 16 while the media player displays the media data units, a skip-ahead request, a dropping of frames of the media data units, a transfer rate of the media data units that is at least a defined threshold higher than a playback rate of the media data units, or an end of viewing event.

The techniques described in this disclosure may be advantageously utilized in a wide variety of situations. For example, the techniques described in this disclosure may be advantageously utilized to distribute appropriate software modules that alleviate or mitigate the effects of playback stalls during the presentation of a media object. Moreover, by prompting a user to download and install a software module that alleviates or mitigates the effects of playback stalls while the user is experiencing the frustration associated a playback stall, the user is more likely to decide to download and install the software module. In this way, the software module is likely to gain marketplace acceptance at a faster pace than if users had to independently seek out the software module on the Web, download the installation package of the software module, and then use the installation package to install the software module.

Figure 2:
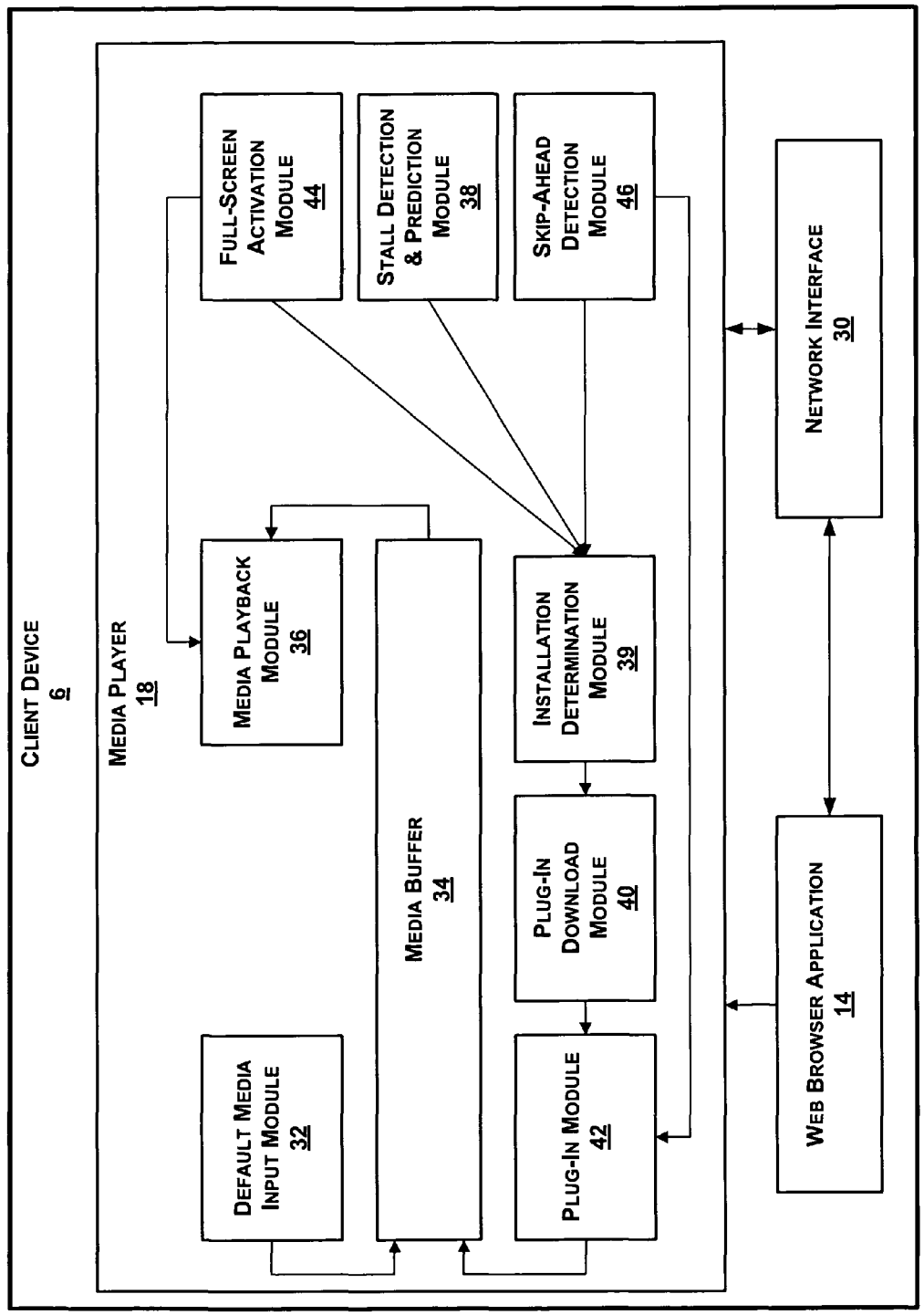
FIG. 2 is a block diagram illustrating details of a first client device illustrated in the example of FIG. 1.

FIG. 2 is a block diagram illustrating exemplary details of client device 6. In the example of FIG. 2, client device 6 includes a network interface 30. Network interface 30 may be a variety of different types of network interfaces. For instance, network interface 30 may be an Ethernet card, a virtual local area network ("VLAN") interface, a token ring network interface, a fiber optic network interface, a wireless network interface (e.g., Bluetooth, Wi-Fi, WiMax, Wireless Broadband, etc.), or another type of network interface. Web browser application 14 and media player 18 may use network interface 30 to send information on network 4 and to receive information from network 4.

User 16 may interact with web browser application 14 to request that web browser application 14 present a web page. When web browser application 14 receives a request from user 16 to present a web page hosted by web server 10, web browser application 14 may cause network interface 30 to send one or more messages to web server 10. The messages sent by network interface 30 include a request to retrieve the web page. Subsequently, network interface 30 may receive one or more messages that include the web page. When network interface 30 receives the messages that include the web page, web browser application 14 may begin to render (i.e., prepare to present) the web page. While rendering the web page, web browser application 14 may determine that the web page includes an embedded media object. When web browser application 14 determines that the web page includes an embedded media object, web browser application 14 may cause media player 18 to start executing on client device 6.

When media player 18 starts executing on client device 6, a default media input module 32 in media player 18 may cause network interface 30 to send one or more media request messages to web server 10. The media request messages instruct web server 10 to start sending a stream of MDUs to client device 6. In response to these media request messages, web server 10 may start to send a stream of MDUs to client device 6. When network interface 30 receives MDUs in the stream of MDUs, default media input module 32 may temporarily store the MDUs in a media buffer 34.

In the example of FIG. 2, media player 18 includes a media playback module 36. Media playback module 36 removes MDUs from media buffer 34 and causes client device 6 to present media data indicated by the removed MDUs. For example, media playback module 36 may remove from media buffer 34 a MDU that indicates a set of audio samples. In this example, media playback module 36 may then cause client device 6 to output audible sounds represented by the set of audio samples.

Furthermore, in the example of FIG. 2, media player 18 includes a stall detection and prediction module 38. While media playback module 36 is presenting MDUs in media buffer 34, stall detection and prediction module 38 automatically attempts to identify an occurrence of a playback stall in the presentation of the MDUs in media buffer 34. For instance, stall detection and prediction module 38 may determine whether a playback stall has occurred, is occurring, or is likely to occur in the near future.

Stall detection and prediction module 38 may determine whether a playback stall has occurred or is likely to occur in the near future in a variety of ways. In a first example, stall detection and prediction module 38 may determine that a playback stall has occurred when the number of MDUs in media buffer 34 falls below a certain threshold. In other words, stall detection and prediction module 38 may determine that a buffer "underflow" condition has occurred in media buffer 34. In a second example, stall detection and prediction module 38 may determine that a playback stall has occurred when video playback stops without the intervention of user 16. In a third example, stall detection and prediction module 38 may determine that a playback stall is likely to occur when user 16 pauses the playback of the media object for a given number of seconds. In many cases, user 16 pauses the playback of the media object in order for media buffer 34 to fill to avoid the possibility of a playback stall that would occur if user 16 did not pause the playback of the media object. In a fourth example, stall detection and prediction module 38 may determine that a playback stall is likely to occur when it takes more than a given number of seconds in order for the amount of media data in media buffer 34 to exceed a given threshold. In this fourth example, stall detection and prediction module 38 may determine that a playback stall is likely to occur when it takes more than ten seconds to receive ten seconds worth of MDUs. In a fifth example, stall detection and prediction module 38 may calculate an average rate at which MDUs are added to media buffer 34 and may identify a playback rate. The playback rate is an average rate at which media playback module 36 removes MDUs from media buffer 34. In this fifth example, if the average rate at which MDUs are added to media buffer 34 is persistently less than the average rate at which media playback module 36 removes MDUs from media buffer 34, eventually a buffer underflow condition will occur in media buffer 34. For this reason, if the average rate at which MDUs are added to media buffer 34 is persistently less than the average rate at which media playback module 36 removes MDUs from media buffer 34, stall detection and prediction module 38 may determine that a playback stall is likely to occur in the near future. In a sixth example, stall detection and prediction module 36 may detect the occurrence of a past playback stall in the playback of a media object by determining that it took a longer period of time to download all or part of the media object than it took to present all or the part of the media object.

When stall detection and prediction module 38 determines that a playback stall has occurred or determines that a playback stall is likely to occur in the near future, an installation determination module 39 in media player 18 may determine whether the playback stall is attributable to a cause that an executable software module such as plug-in module 42 is able to remedy. Plug-in module 42 is executable software that may be downloaded and installed if not already downloaded and installed. For instance, installation determination module 39 may determine that the playback stall is attributable to the fact that client device 6 is receiving MDUs in the media object from web server 10 at a transfer rate that is too slow. In this instance, installation determination module 39 may determine that the playback stall is attributable to a cause that plug-in module 42 is able to remedy.

If installation determination module 39 determines that the playback stall is attributable to a cause that plug-in module 42 is able to remedy, installation determination module 39 may determine whether plug-in module 42 is currently installed in media player 18. If installation determination module 39 determines that plug-in module 42 is already installed in media player 18, installation determination module 39 may not perform any further action. If installation determination module 39 determines that plug-in module 42 is not currently installed in media player 18, installation determination module 39 may cause client device 6 to prompt user 16 to decide whether to download and install plug-in module 42. For example, installation determination module 39 may cause client device 6 to display an alert window that gives user 16 an option to download and install plug-in module 42. This alert window may or may not notify that user 16 may be required to pay a charge in order to download and install plug-in module 42. Furthermore, installation determination module 39 may cause client device 6 to display this alert window under other circumstances. For instance, installation determination module 39 may cause client device 6 to display this alert when user 16 instructs media player 18 to switch to a full-screen playback mode, upon determining that a higher-quality version of the video is available, or other circumstances as described in more detail below.

The action of a plug-in download module 42 in media player 18 depends on whether user 16 decides to download and install plug-in module 42. For instance, if user 16 decides not to download and install plug-in module 42, plug-in download module 40 might not perform any action. On the other hand, if user 16 decides to download and install plug-in module 42, plug-in download module 40 may cause network interface 30 to output a download request to download server 12. When download server 12 receives this download request, download server 12 may send an installation package to client device 6. Upon receiving the installation package from download server 12, plug-in download module 40 may use the installation package to install plug-in module 42.

After plug-in download module 40 installs plug-in module 42, plug-in module 42 may cause client device 6 to perform one or more actions to enable faster reception of media data. For example, plug-in module 42 may disable default media input module 32. Next, plug-in module 42 may cause network interface 30 to output a message that alerts web server 10 that media player 18 is now capable of receiving media data units in accordance with a "swarming" technology. Subsequently, when network interface 30 receives sets of MDUs from web server 10 and ones of devices 8, plug-in module 42 may place the received MDUs in a correct order in media buffer 34. Because network interface 30 is receiving sets of MDUs from more than one device, the average transfer rate at which client device 6 receives MDUs may be greater than if network interface 30 were only receiving sets of MDUs from a single device. Furthermore, in this example, client device 6 may receive a request from web server 10 to send sets of MDUs to one or more of devices 8. If media buffer 34 includes the requested sets of MDUs, plug-in module 42 may cause network interface 30 to send the requested sets of MDUs to the one or more of devices 8.

In the example of FIG. 2, media player 18 also includes a full-screen activation module 44. Full-screen activation module 44 causes client device 6 to display an on-screen full-screen activation button. When user 16 selects the full-screen activation button, full-screen activation module 44 instructs media playback module 36 to present the media object in full-screen mode. When media playback module 36 presents a media object in full-screen mode, the video portions of the media object occupy all of, or at least a substantial portion of, the viewable area of the display apparatus. Furthermore, when user 16 selects the full-screen activation button, full-screen activation module 44 may cause installation determination module 39 to determine whether plug-in module 42 is installed and, if not, may cause plug-in download module 40 to download and install plug-in module 42.

Furthermore, in the example of FIG. 2, media player 18 includes a skip-ahead detection module 46. During playback of a media object, skip-ahead detection module 46 determines whether user 16 has instructed media player 18 to present media data associated with a point along a playback timeline of the media object that media player 18 has not yet received. In other words, skip-ahead detection module 46 determines whether user 16 wants to skip ahead to a portion of the media object that has not yet been downloaded. For example, media player 18 may have received media data associated with the first minute through the tenth minute of a media object and has played back the media data associated with the first minute through the fifth minute of the media object. In this example, skip-ahead detection module 46 may determine that user 16 has instructed media player 18 to present media data associated with the thirtieth minute of the media object. When skip-ahead detection module 46 determines that user 16 has instructed media player 18 to present media data associated with a point along a playback timeline of the media object that media player 18 has not yet received, skip-ahead detection module 46 may cause installation determination module 39 to determine whether plug-in module 42 is installed and, if not, may cause plug-in module 40 to download and install plug-in module 42. After plug-in module 42 is installed, plug-in module 42 may download and begin presenting the media data associated with the selected point along the playback timeline of the media object and media data associated with points along the playback timeline of the media object that follow the selected point along the playback timeline.

FIGS. 3A-3F are flowcharts illustrating exemplary operations of modules in media player 18. It should be appreciated that the exemplary operations illustrated in the examples of FIGS. 3A-3F are merely exemplary operations and that many other operations are possible and within the scope of this disclosure.

Figure 3A:
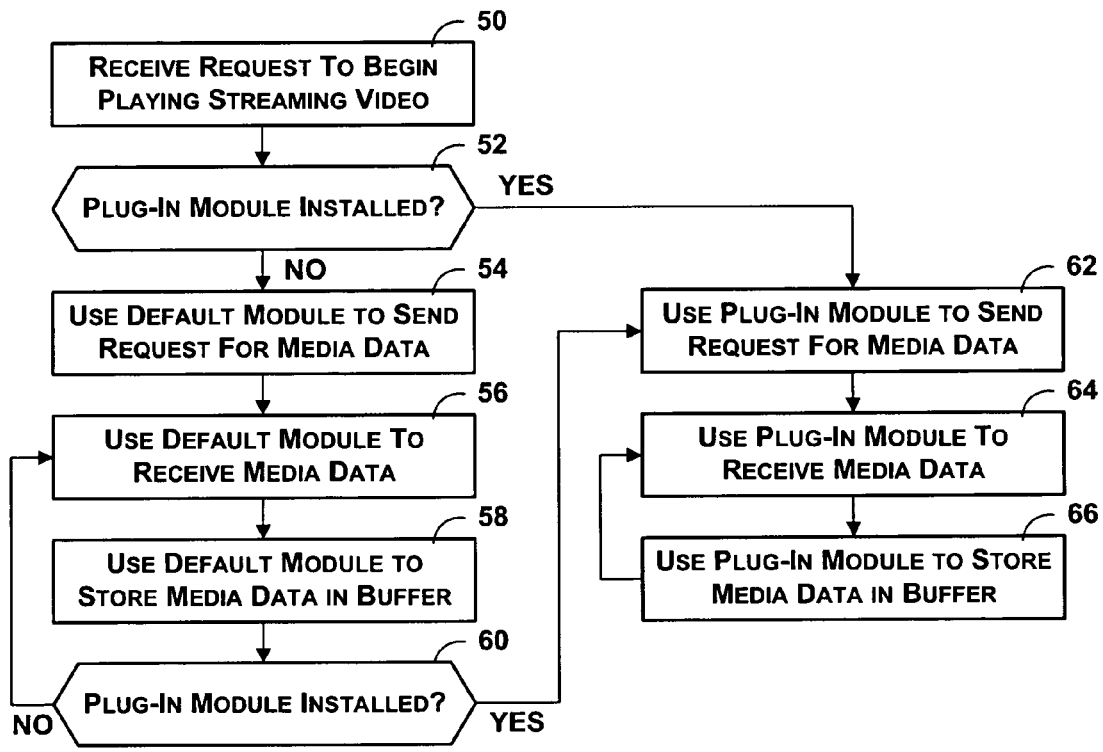
FIG. 3A is a flowchart illustrating an exemplary operation of a default media input module and a plug-in module within a first media player illustrated in the example of FIG. 2.

FIG. 3A is a flowchart illustrating an exemplary operation of default media input module 32 and plug-in module 42 in media player 18 (FIG. 2). In accordance with this exemplary operation, media player 18 initially receives a request to begin playing a media object (50). For instance, media player 18 may receive a request to begin playing the media object from user 16. Upon receiving this request, default media input module 32 may determine whether plug-in module 42 is currently installed (52).

If default media input module 32 determines that plug-in module 42 is not currently installed in media player 18 ("NO" of 52), default media input module 32 may cause network interface 30 to send a request for the media object to web server 10 (54). Subsequently, default media input module 32 may receive sets of MDUs in the media object (56). When default media input module 32 receives a set of MDUs in the media object, default media input module 32 may store the set of MDUs into media buffer 34 (58). After storing the set of MDUs into media buffer 34, default media input module 32 may again determine whether plug-in module 42 is installed (60). If plug-in module 42 is not installed ("NO" of 60), default media input module 32 may loop back and continue to receive sets of MDUs (56).

If default media input module 32 determines that plug-in module 42 is currently installed in media player 18 ("YES" of 52 or "YES" of 60), plug-in module 42 may cause network interface 30 to send a request to web server 10 (62). Subsequently, plug-in module 42 may receive sets of MDUs in the media object from web server 10 and in some embodiments concurrently from one or more of devices 8 (64). When plug-in module 42 receives a set of MDUs in the media object, plug-in module 42 may store the set of MDUs into media buffer 34 (66). After storing the set of MDUs into media buffer 34, plug-in module 42 may loop back and continue to receive sets of MDUs (64).

Figure 3B:
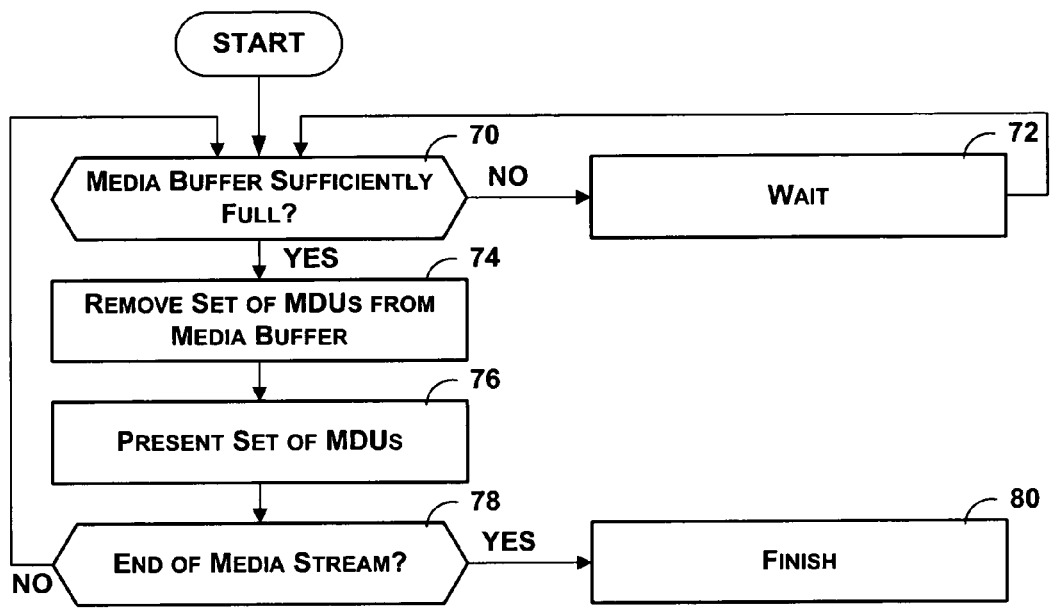
FIG. 3B is a flowchart illustrating an exemplary operation of a media playback module within a first media player illustrated in the example of FIG. 2.

FIG. 3B is a flowchart illustrating an exemplary operation of media playback module 36 within media player 18 (FIG. 2). Initially, media playback module 36 determines whether media buffer 34 is sufficiently full (70). If media playback module 36 determines that media buffer 34 is not sufficiently full ("NO" of 70), media playback module 36 may wait a given period of time (72). After waiting the given period of time, media playback module 36 may again determine whether media buffer 34 is sufficiently full (70).

If media playback module 36 determines that media buffer 34 is sufficiently full ("YES" of 70), media playback module 36 may remove a set of MDUs from media buffer 34 (74). Next, media playback module 36 may cause client device 6 to present the removed set of MDUs (76). Media playback module 36 may then determine whether the media object has ended (78). If the media object has ended ("YES" of 78), media player 18 finishes playing the streaming video (80). On the other hand, if media playback module 36 determines that the media object has not ended ("NO" of 78), media playback module 36 may loop back and again determine whether media buffer 34 is sufficiently full (70).

Figure 3C:
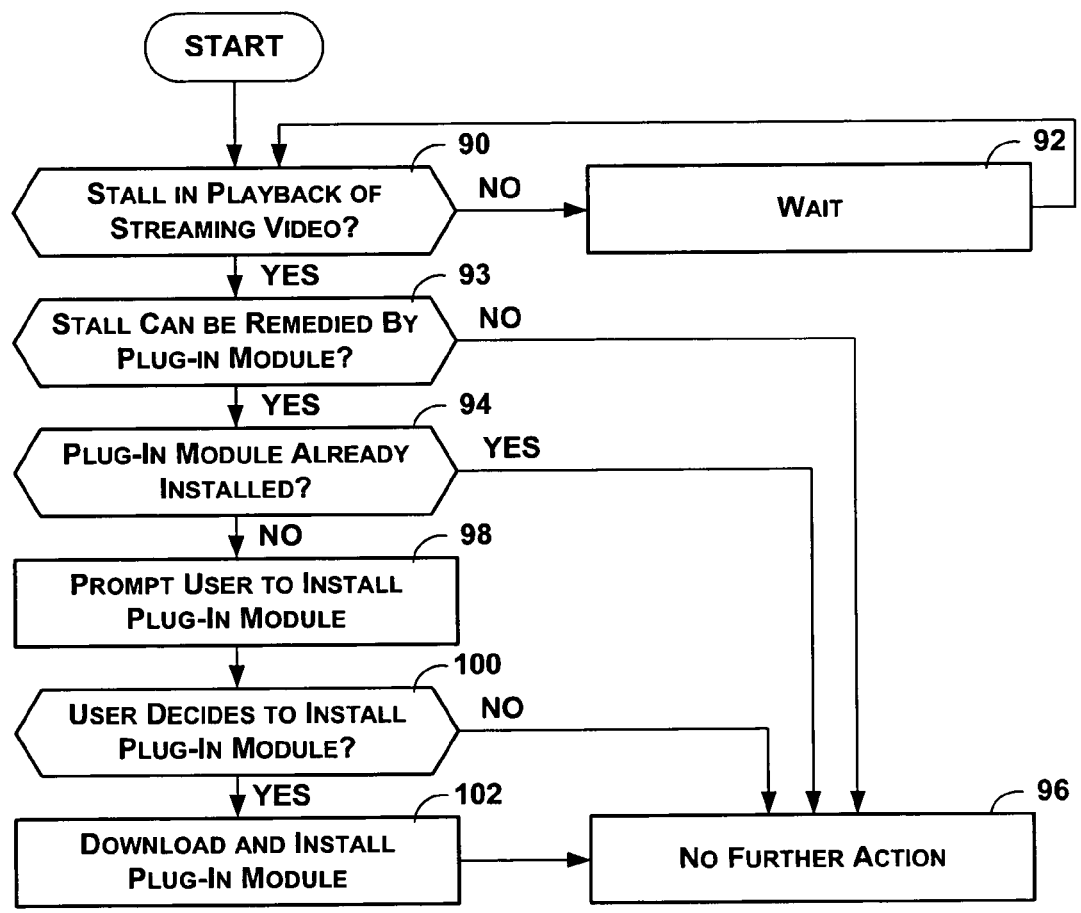
FIG. 3C is a flowchart illustrating an exemplary operation of a stall detection and prediction module, a installation determination module, and a plug-in download module within a first media player illustrated in the example of FIG. 2.

FIG. 3C is a flowchart illustrating an exemplary operation of stall detection and prediction module 38, installation determination module 39, and plug-in download module 40 within media player 18 (FIG. 2) in embodiments where the viewing event is a playback stall. In accordance with this exemplary operation, stall detection and prediction module 38 in media player 18 may automatically attempt to identify an occurrence of a playback stall in the presentation of media data in the media object (90). For instance, stall detection and prediction module 38 may determine whether there is currently a playback stall in the media object or whether there is likely to be a playback stall in the media object in the near future. If stall detection and prediction module 38 does not identify a playback stall of the presentation of the media data in the media object ("NO" of 90), stall detection and prediction module 38 may wait a given period of time (92). After waiting the given period of time, stall detection and prediction module 38 may loop back and again attempt to identify a playback stall of the presentation of the media data in the media object (90).

If stall detection and prediction module 38 identifies a playback stall in the presentation of the media data in the media object ("YES" of 90), installation determination module 39 may determine whether the stall is attributable to a cause that plug-in module 42 can remedy (93). If installation determination module 39 determines that the stall is attributable to a cause that plug-in module 42 cannot remedy ("NO" of 93), further actions may not be required of stall detection and prediction module 38, installation determination module 39, and plug-in module 42 (96). On the other hand, if installation determination module 39 determines that the stall is attributable to a cause that plug-in module 42 can remedy ("YES" of 93), installation determination module 39 in media player 18 may determine whether plug-in module 42 is installed in media player 18 (94). If installation determination module 39 determines that plug-in module 42 is already installed in media player 18 ("YES" of 94), further actions may not be required of stall detection and prediction module 38, installation determination module 39, and plug-in module 42 (96).

On the other hand, if installation determination module 39 determines that plug-in module 42 is not already installed ("NO" of 94), installation determination module 39 may cause client device 6 to prompt user 16 to decide whether to download and install plug-in module 42 (98). Installation determination module 39 may then determine whether user 16 decided to download and install plug-in module 42 (100). If user 16 decides not to download and install plug-in module 42 ("NO" of 100), further actions may not be required of stall detection and prediction module 38, installation determination module 39, and plug-in download module 40 (96). If user 16 decides to download and install plug-in module 42 ("YES" of 100), plug-in download module 40 downloads and installs plug-in module 42 (102). Subsequently, further actions may not be required of stall detection and prediction module 38, installation determination module 39, and plug-in download module 40 (96).

Figure 3D:
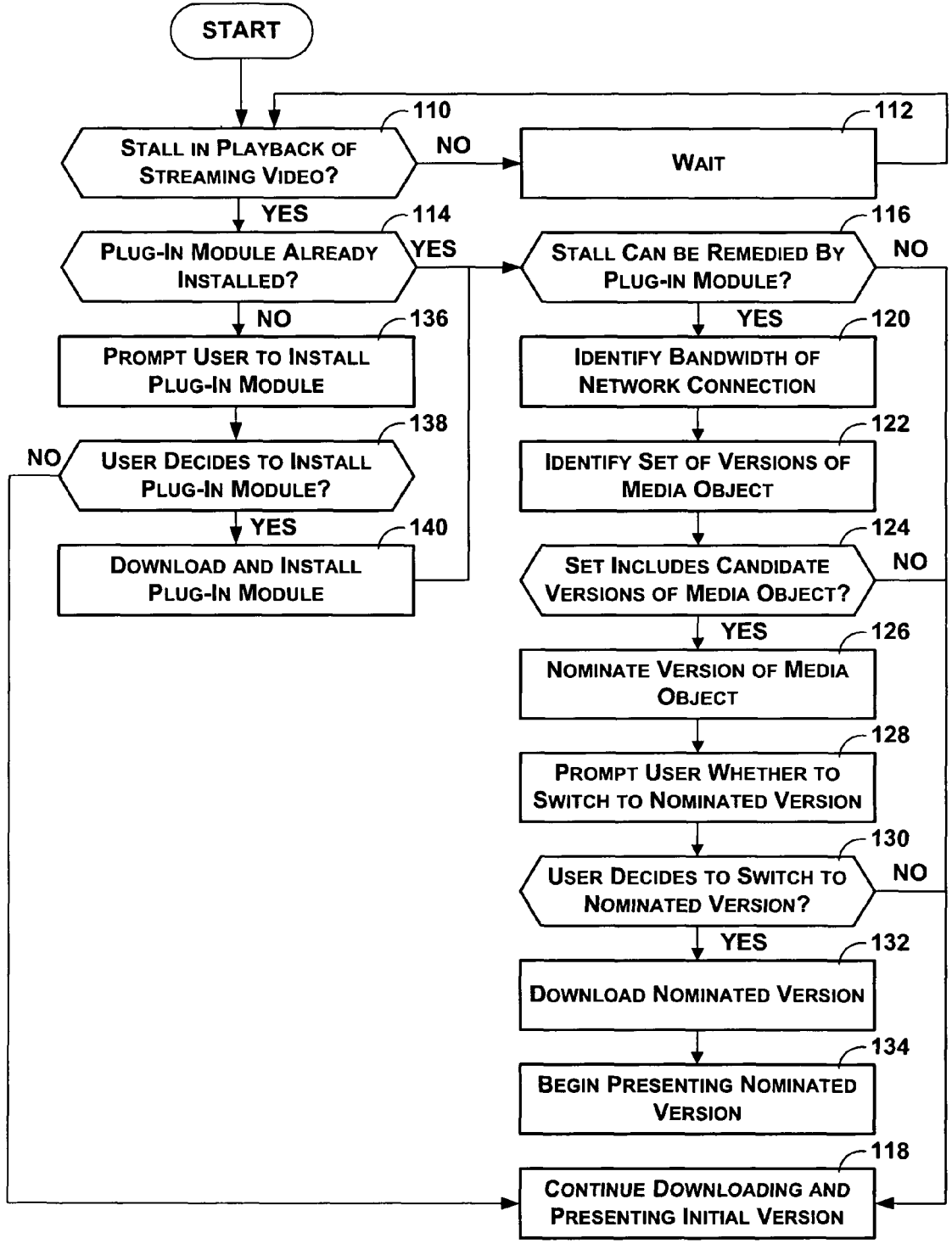
FIG. 3D is a flowchart illustrating a first additional exemplary operation of a first media player.

FIG. 3D is a flowchart illustrating a first additional exemplary operation of media player 18 (FIG. 2). In accordance with this exemplary operation, stall detection and prediction module 38 in media player 18 may automatically attempt to identify an occurrence of a playback stall in the presentation of an initial version of the media object (110). As used in this disclosure, an initial version of the media object may be the version of the media object that is initially requested by user 16. Stall detection and prediction module 38 may, for instance, determine whether there is currently a playback stall in the media object or whether there is likely to be a playback stall in the media object in the near future. If stall detection and prediction module 38 does not identify a playback stall of the presentation of the media data in the media object ("NO" of 110), stall detection and prediction module 38 may wait a given period of time (112). After waiting the given period of time, stall detection and prediction module 38 may loop back and again attempt to identify a playback stall of the presentation of the media data in the media object (110).

If stall detection and prediction module 38 identifies a playback stall in the presentation of the media data in the media object ("YES" of 110), installation determination module 39 may determine whether plug-in module 42 is already installed in media player 18 (114). If installation determination module 39 determines that plug-in module 42 is already installed in media player 18 ("YES" of 114), plug-in module 42 may determine whether the stall is attributable to a cause that plug-in module 42 can remedy (116). In other words, plug-in module 42 may determine whether plug-in module 42 is configured to use a download acceleration technique to download the initial version of the media object at a transfer rate that is sufficient to prevent future playback stalls in the playback of the initial version of the media object. If plug-in module 42 determines that the playback stall is attributable to a cause that plug-in module 42 cannot remedy ("NO" of 116), plug-in module 42 may download, and media playback module 36 may present, subsequent media data in the initial version of the media object (118).

On the other hand, if plug-in module 42 determines that the playback stall is attributable to a cause the plug-in module 42 can remedy ("YES" of 116), plug-in module 42 may identify a bandwidth of network connection 20 (120), i.e. the transfer rate between network 4 and client device 6. For example, plug-in module 42 may identify the bandwidth of network connection 20 as 2.5 megabytes/second. After identifying the bandwidth of network connection 20, plug-in module 42 may identify a set of versions of the media object that are available for download (122). For example, plug-in module 42 may determine that there are three versions of a media object available for download: a version having a playback rate of 1.5 megabytes/second, a version having a playback rate of 2.4 megabytes/second, and a version having a playback rate of 3.0 megabytes/second. Next, installation determination module 39 may determine whether the set of versions of the media object includes one or more candidate versions of the media object (124). "Candidate" versions of the media object are versions of the media object that can be downloaded via network connection 20 without the occurrence of a playback stall due to the bandwidth of network connection 20, i.e. the transfer rate between network 4 and client device 6. To avoid a playback stall the playback rate of the candidate versions of the media object will be less than the transfer rate between network 4 and client device 6. Continuing the previous example, if the bandwidth of network connection 20 is 2.5 megabytes/second, plug-in module 42 identifies the version having the playback rate of 1.5 megabytes/second and the version having the playback rate of 2.4 megabytes/second as candidate versions of the media object because these versions can be downloaded at a transfer rate of 2.5 megabit/second and played back at their playback rate without playback stall. If the set of versions of the media object does not include a candidate version of the media object ("NO" of 124), plug-in module 42 may download, and media playback module 36 may present, subsequent media data in the initial version of the media object (118).

If the set of versions of the media object includes one or more candidate versions of the media object ("YES" of 124), plug-in module 42 may nominate one of the candidate versions of the media object (126). The nominated one of the candidate versions of the media object may be the one of the candidate versions that has the highest audio/video quality. For example, if the candidate versions of the media object include the version having a playback rate of 1.5 megabytes/second and the version having a playback rate of 2.4 megabytes/second, and the bandwidth of network connection 20, i.e. transfer rate, is 2.5 megabytes/second, plug-in module 42 may nominate the version having a playback rate of 2.4 megabytes/second because the version having a playback rate of 2.4 megabytes/second is likely to have higher audio/video quality than the version having a playback rate of 1.5 megabytes/second.

After nominating a version of the media object, plug-in module 42 may prompt user 16 to decide whether to switch from the initial version of the media object to the nominated version of the media object (128). When plug-in module 42 prompts user 16 to decide whether to switch from the initial version of the media object to the nominated version of the media object, plug-in module 42 may indicate to user 16 that user 16 may be required to pay a tariff in order to cause the subsequent media data in the nominated version of the media object to be presented. Next, plug-in module 42 may determine whether user 16 has decided whether to switch from the initial version of the media object to the nominated version of the media object (130). If plug-in module 42 determines that user 16 has decided not to switch from the initial version of the media object to the nominated version of the media object ("NO" of 130), plug-in module 42 may download, and media playback module 36 may present, subsequent media data in the initial version of the media object (118).

If plug-in module 42 determines that user 16 has decided to switch from the initial version of the media object to the nominated version of the media object ("YES" of 130), plug-in module 42 may begin downloading the nominated version of the media object (132). Media playback module 36 may then start presenting the nominated version of the media object from the current location of the media object (134). In other words, media playback module 36 presents media data that occurs subsequent to the media data of the initial version that has already been presented. For example, if media player 18 has already presented the first five minutes of initial version of the media object, media player 18 may begin presenting the nominated version of the media object from the fifth minute of the nominated version of the media object onward. In this way, media player 18 begins presenting the nominated version of the media object from a point at which media player 18 left off presenting the initial version of the media object. While the nominated version of the media object may have lower audio/visual quality than the initial version, media player 18 may be capable of downloading the nominated version of the media object without the occurrence of playback stalls. For at least some users, the absence of playback stalls in the presentation of the media object may offset the lower audio/visual quality of the nominated version of the media object.

On the other hand, if installation determination module 39 determines that plug-in module 42 is not already installed ("NO" of 114), installation determination module 39 may cause client device 6 to prompt user 16 to decide whether to download and install plug-in module 42 (136). Installation determination module 39 may then determine whether user 16 decided to download and install plug-in module 42 (138). If user 16 decides not to download and install plug-in module 42 ("NO" of 138), default media input module 32 may download, and media playback module 36 may present, subsequent media data in the initial version of the media object (118). If user 16 decides to download and install plug-in module 42 ("YES" of 138), plug-in download module 40 downloads and installs plug-in module 42 (140). Subsequently, plug-in module 42 may determine whether plug-in module 42 can remedy the playback stall (116), and so on.

Figure 3E:
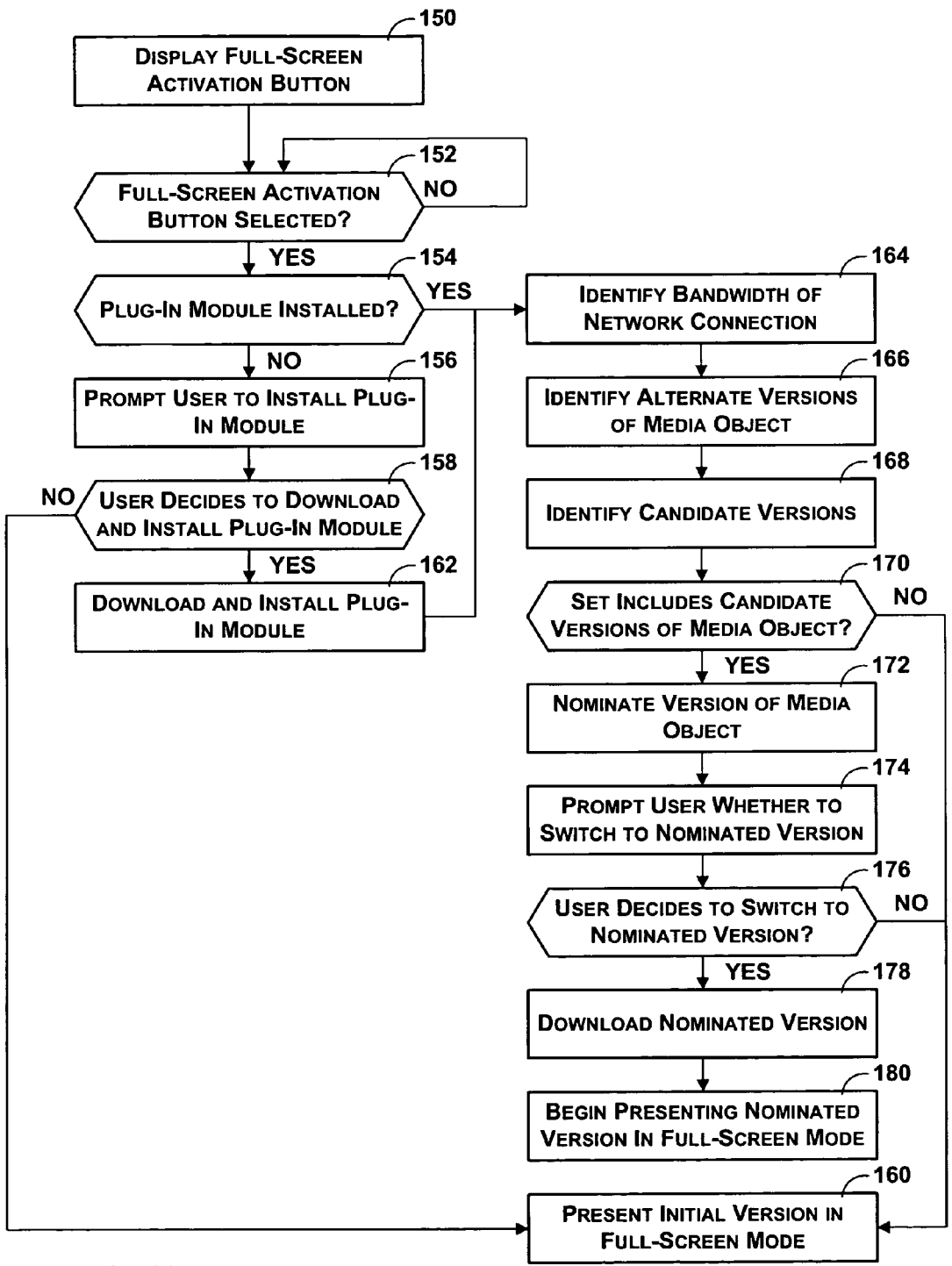
FIG. 3E is a flowchart illustrating a second additional exemplary operation of a first media player.

FIG. 3E is a flowchart illustrating a second additional exemplary operation of media player 18. In accordance with this exemplary operation, full-screen activation module 44 in media player 18 causes client device 6 to present a "full-screen activation" button (150), in embodiments where the viewing event is that a user of client device 6 desires to view the media data full screen. From the perspective of user 16, the purpose of the "full-screen activation" button is to cause media player 18 to display a media object in the complete viewable area of a display unit (e.g., a monitor). After full-screen activation module 44 causes client device 6 to present the "full-screen activation" button, full-screen activation module 44 determines whether user 16 has selected the "full-screen activation" button (152). In other words, full-screen activation module 44 determines whether user 16 has elected to view the media data in the media object in a full-screen mode. If user 16 has not selected the "full-screen activation" button ("NO" of 152), full-screen activation module 44 takes no action and may again determine whether user 16 has selected the "full-screen activation" button (152). On the other hand, if user 16 has selected the "full-screen activation" button ("YES" of 152), installation determination module 39 may determine whether plug-in module 42 is installed in media player 18 (154).

If installation determination module 39 determines that plug-in module 42 is not already installed in media player 18 ("NO" of 154), installation determination module 39 may cause client device 6 to prompt user 16 to install plug-in module 42 (156). Installation determination module 39 may then determine whether user 16 decided to download and install plug-in module 42 (158). If user 16 decided not to download and install plug-in module 42 ("NO" of 158), full-screen activation module 44 may cause media playback module 36 to present subsequent media data in the initial version of the media object in full-screen mode (160). On the other hand if user 16 decided to download and install plug-in module 42 ("YES" of 158), plug-in download module 40 downloads and installs plug-in module 42 (162).

If plug-in module 42 is installed in media player 18 ("YES" of 154) or after plug-in download module 40 downloads and installs plug-in module 42, plug-in module 42 may identify the bandwidth of network connection 20, i.e. the transfer rate between network 4 and client device 6 (164). After identifying the bandwidth of network connection 20, plug-in module 42 may identify a set of alternate versions of the media object that are available to be downloaded from network 4 (166).

Next, plug-in module 42 may determine whether the set of versions of the media object includes one or more candidate versions of the media object (168). "Candidate" versions of the media object are versions of the media object that can be downloaded via network connection 20 without the occurrence of a playback stall due to the bandwidth of network connection 20. For example, the playback rate of the candidate versions of the media object is less than or equal to the transfer rate between network 4 and client device 6. If the set of versions of the media object does not include a candidate version of the media object ("NO" of 170), plug-in module 42 may download subsequent media data in the initial version of the media object, and media playback module 36 may present the subsequent media data in initial version of the media object in full-screen mode (160).

If the set of versions of the media object includes one or more candidate versions of the media object ("YES" of 170), plug-in module 42 may nominate one of the candidate versions of the media object (172). The nominated one of the candidate versions of the media object may be the one of the candidate versions that has the highest audio/video quality. After nominating a version of the media object, plug-in module 42 may prompt user 16 to decide whether to switch from the initial version of the media object to the nominated version of the media object (174). When plug-in module 42 causes client device 6 to prompt user 16 to decide whether to switch to the nominated (and possibly higher-quality) version of the media object, plug-in module 42 may alert user 16 that the alternate version of the media object is only available if user 16 pays a tariff or a fee. For example, plug-in module 42 may cause client device 6 to inform user 16 that a higher-quality, stall-free version of the media object is available for the price of $2.00.

Next, plug-in module 42 may determine whether user 16 has decided to switch from the initial version of the media object to the nominated version of the media object (176). If plug-in module 42 determines that user 16 has decided not to switch from the initial version of the media object to the nominated version of the media object ("NO" of 176), plug-in module 42 may download subsequent media data in the initial version of the media object, and media playback module 36 may present the subsequent media data in the initial version of the media object in full-screen mode (160).

If plug-in module 42 determines that user 16 has decided to switch from the initial version of the media object to the nominated version of the media object ("YES" of 176), plug-in module 42 may begin downloading subsequent media data in the nominated version of the media object (178). Plug-in module 42 may then start presenting the subsequent media data in the nominated version of the media object in full-screen mode (180). In this way, media player 18 may present the highest-quality version of the media object that is likely to be free of playback stalls when user 16 decides to view the media object in full-screen mode.

Figure 3F:
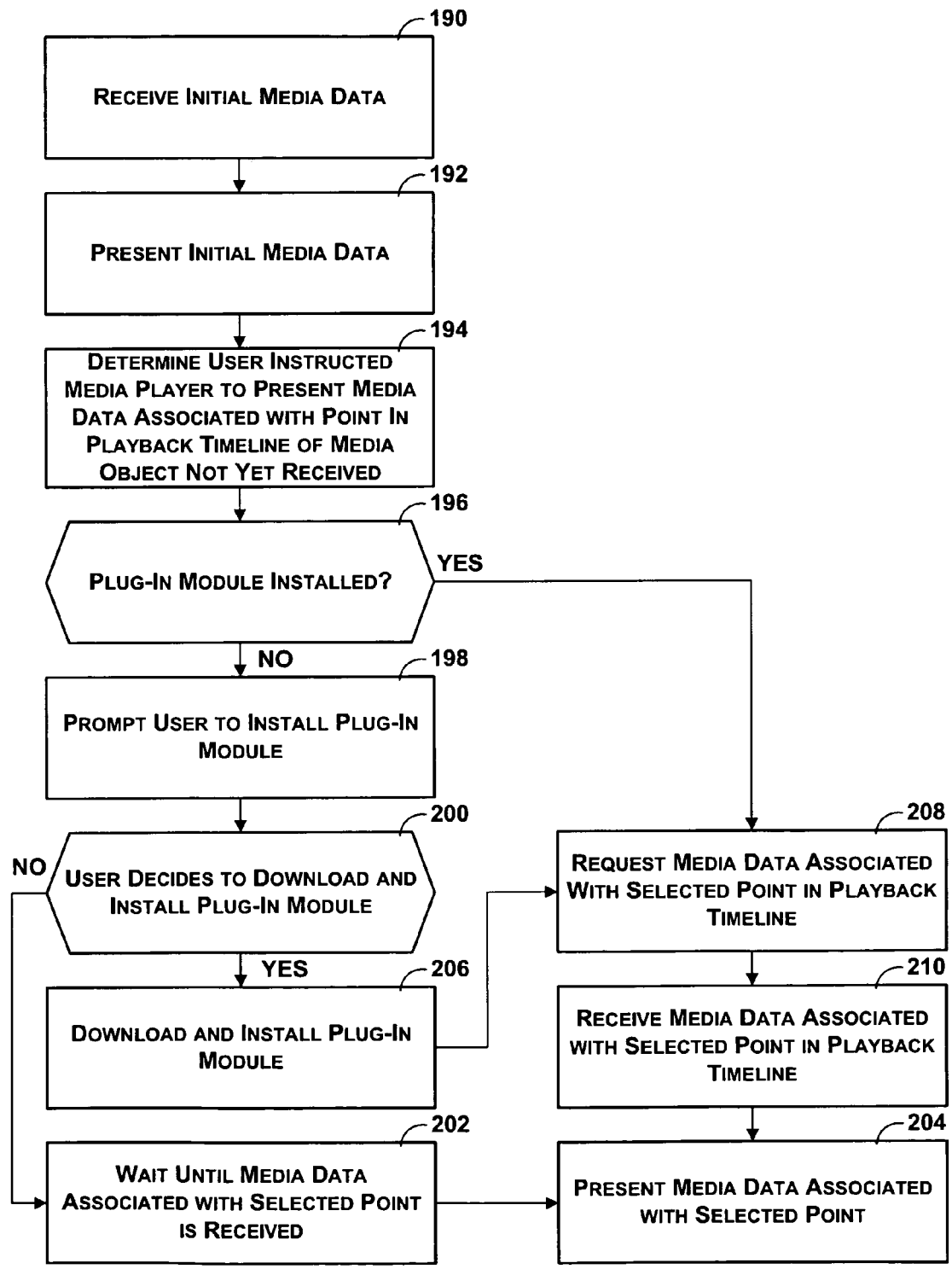
FIG. 3F is a flowchart illustrating a third additional exemplary operation of a first media player.

FIG. 3F is a flowchart illustrating a third alternate operation of media player 18. In accordance with the alternate operation of media player 18 illustrated in FIG. 3F, default media input module 32 may receive initial media data in a media object (190). For example, media input module 32 may receive media data associated with the first minute through the seventh minute of a media object. When media input module 32 has received at least some of the initial media data in the media object, media playback module 36 may present some or all of the received initial media data (192).

After media playback module 36 has presented at least some of the received initial media data, skip-ahead detection module 46 may determine that user 16 has instructed media player 18 to present media data associated with a point along the playback timeline of the media object that media player 18 has not yet received (194). For example, when media playback module 36 has presented the initial media data associated with the first through the fifth minute of the media object, user 16 may instruct media player 18 to present media data associated with the fifteenth minute of the media object.

Media player 18 may provide an interface that allows user 16 to instruct media player 18 to present media data associated with an arbitrary point along the playback timeline of a media object. In a first example, media player 18 may provide a playback meter that includes a bar that indicates the entire playback timeline of the media object and an icon positioned along the bar to indicate how much of the media object has been played back. In this first example, user 16 may instruct media player 18 to present media data at an arbitrary point along the playback timeline of the media object by "dragging" the icon to a position on the bar associated with the arbitrary point along the playback timeline of the media object. In a second example, media player 18 may provide a text box into which user 16 may input a value associated with a point along the playback timeline of a media object. In this second example, user 16 may, for instance, input the value "15" to instruct media player 18 to present media data associated with the fifteenth minute of the media object.

When skip-ahead detection module 46 determines that user 16 has instructed media player 18 to present media data associated with a point along the playback timeline of the media object that media player 18 has not yet received, installation determination module 39 may determine whether plug-in module 42 is installed in media player 18 (196). If installation determination module 39 determines that plug-in module 42 is not already installed in media player 18 ("NO" of 196), installation determination module 39 may cause client device 6 to prompt user 16 to install plug-in module 42 (198). Installation determination module 39 may then determine whether user 16 decided to download and install plug-in module 42 (200). If user 16 decided not to download and install plug-in module 42 ("NO" of 200), media playback module 36 may wait until default media input module 32 receives media data associated with the selected point along the playback timeline of the media object and stores media data associated with the selected point along the playback timeline of the media object into media buffer 34 (202). After the media data associated with the selected point along the playback timeline of the media object is stored into media buffer 34, media playback module 36 may present the media data associated with the selected point along the playback timeline of the media object and media data associated with points along the playback timeline of the media object that follow the selected point along the playback timeline of the media object (204). On the other hand if user 16 decided to download and install plug-in module 42 ("YES" of 200), plug-in download module 40 downloads and installs plug-in module 42 (206).

If plug-in module 42 is installed in media player 18 ("YES" of 196) or after plug-in download module 40 downloads and installs plug-in module 42, plug-in module 42 may request the media data associated with the selected point along the playback timeline of the media object (208). Next, plug-in module 42 may receive the media data associated with the selected point along the playback timeline of the media object and media data associated with points along the playback timeline of the media object that follow the selected point (210). Subsequently, media playback module 36 may present the media data associated with the selected point along the playback timeline of the media object and the media data associated with the points along the playback timeline of the media object that follow the selected point (204).

Figure 4:
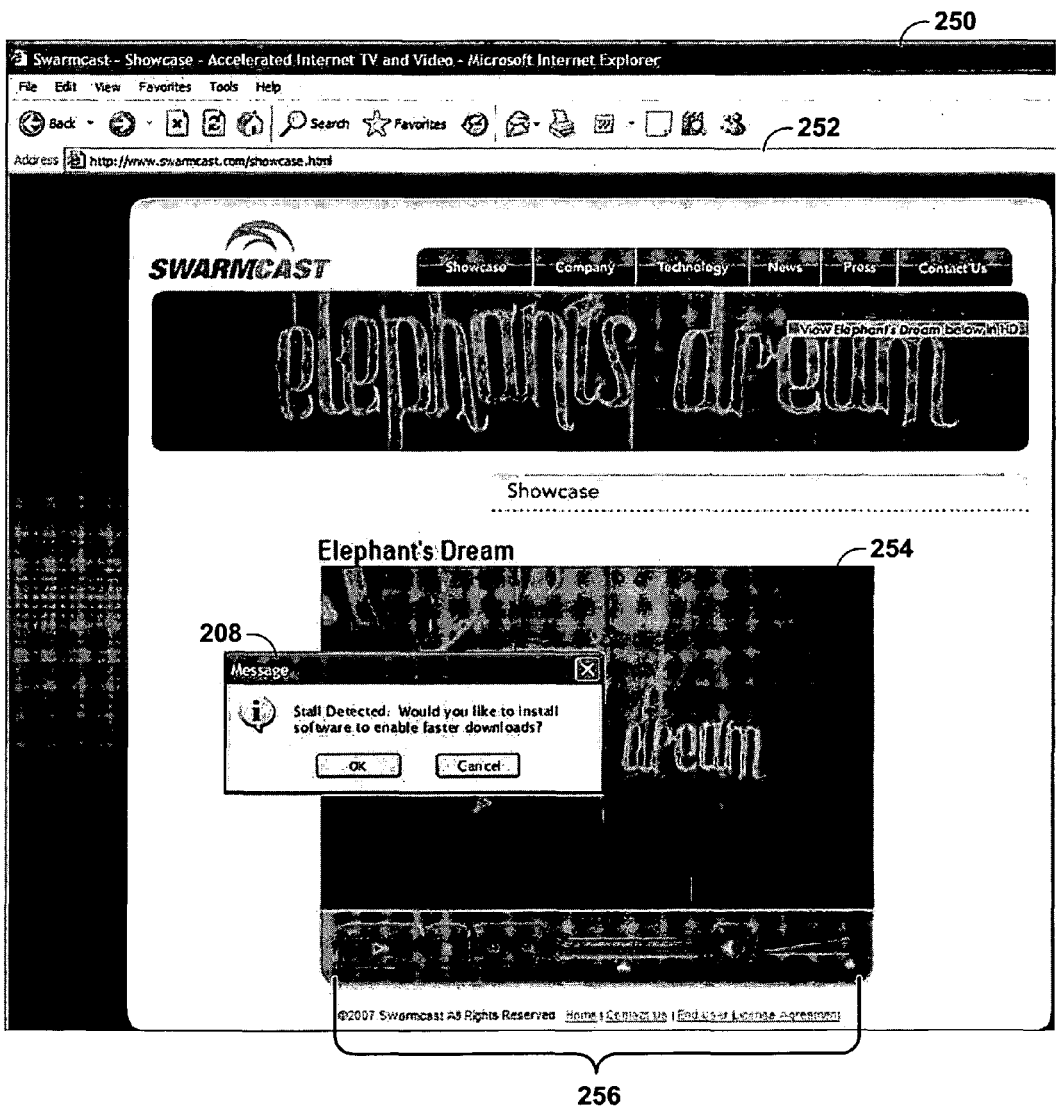

FIG. 4 is a screen illustration showing an exemplary user interface 250 in which user 16 is prompted to install plug-in module 42. Web browser application 14 may cause client device 6 to present user interface 250 when user 16 enters a Universal Resource Locator ("URL") into address bar 252 or otherwise instructs web browser application 14 to retrieve and present a web page at this URL. As illustrated in the example of FIG. 4, user 16 has entered or otherwise instructed web browser application 14 to retrieve and to present a web page at the URL "http://www.swarmcast.com/showcase-.html".

Furthermore, user interface 250 includes an embedded media player 254. Although presented within a web page, embedded media player 254 may, in fact, be one configuration of media player 18 (FIG. 2). As illustrated in the example of FIG. 4, embedded media player 254 may include a set of playback controls 256. User 16 may use playback controls 256 to control how embedded media player 254 presents a media object.

During playback of a media object, stall detection and prediction module 38 in embedded media player 254 may determine that a playback stall has occurred or that a playback stall is likely to occur in the near future. When stall detection and prediction module 38 determines that a playback stall has occurred or that a playback stall is likely to occur in the near future and when installation determination module 39 in embedded media player 204 determines that plug-in module 42 is not installed, installation determination module 39 may cause client device 6 to present a message window 208. Message window 208 may include a message that prompts user 16 to decide whether to install plug-in module 42. In the example of FIG. 4, message window 128 includes the message "Stall Detected. Would you like to install software to enable faster downloads?" In addition, message window 208 includes an "OK" button and a "Cancel" button. If user 16 clicks or otherwise selects the "OK" button, plug-in download module 40 may download and install plug-in module 42. On the other hand, if user 16 clicks or otherwise selects the "Cancel" button, plug-in download module 40 does not download or install plug-in module 42.

Figure 5:
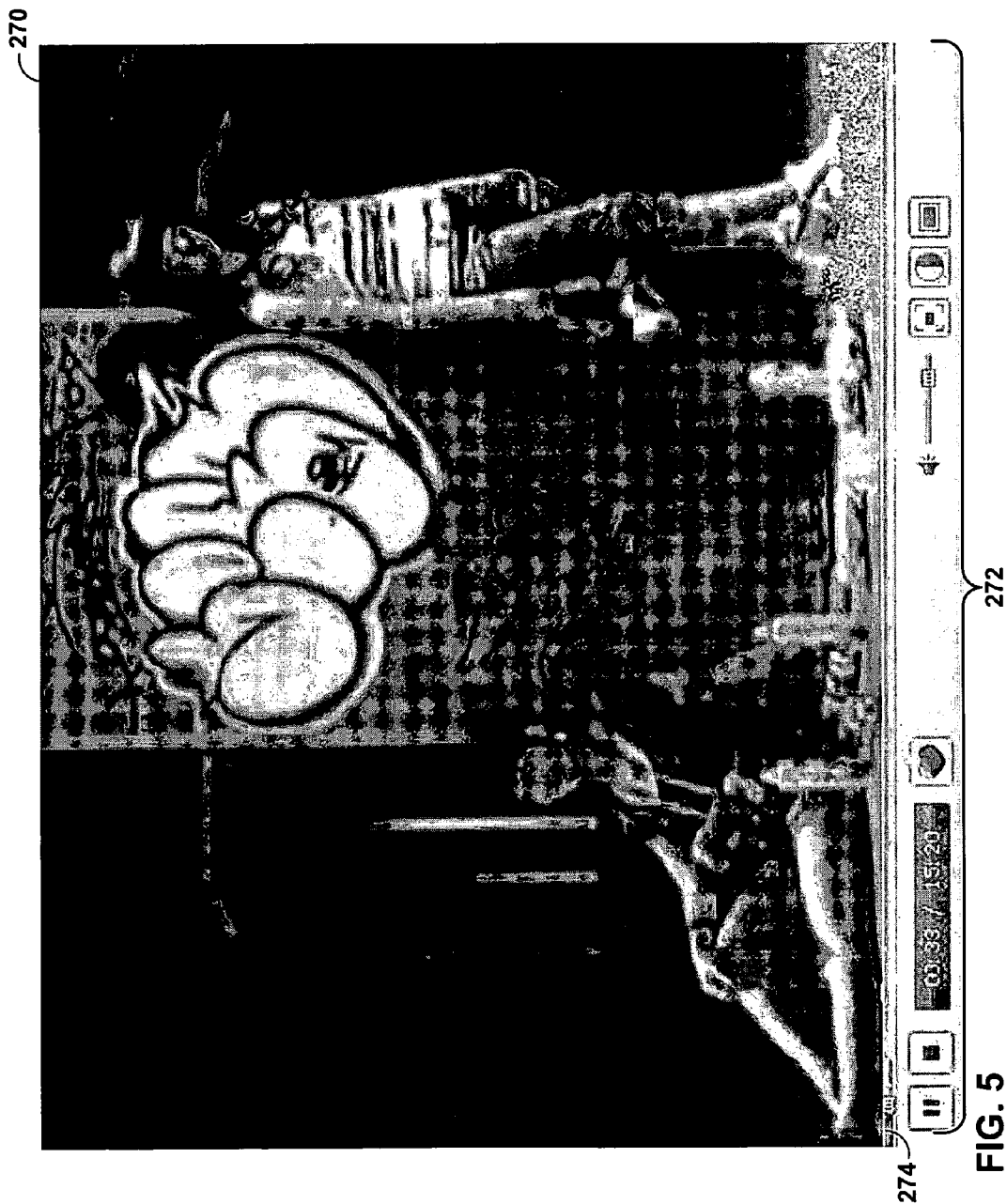
FIG. 5 is a screen illustration showing an exemplary media player that is presenting a video clip.

FIG. 5 is a screen illustration showing an exemplary media player 270 that is presenting a video clip. Media player 270 may be an alternate configuration of media player 18 (FIG. 2). Like embedded media player 254, media player 270 includes a set of playback controls 272. User 16 may use playback controls 272 to control how media player 270 presents the video clip. For instance, playback controls 272 may include a "pause" button, a "stop" button, a volume slider, a button that adjusts the size of the video clip, a button that enables user 16 to adjust the brightness of the video clip, a button that allows user 16 to adjust the aspect ratio of the video clip (e.g., enable wide-screen mode), and a button that enables full-screen playback of the video clip.

In addition, media player 270 includes a playback meter 274 that indicates how much of the video clip has been downloaded and how much of the video clip has been played back. In the example of FIG. 5, the light gray portion of playback meter 274 indicates how much of the video clip has been downloaded and the dark gray portion of playback meter 274 indicates how much of the video clip has been played back.

Figure 6:
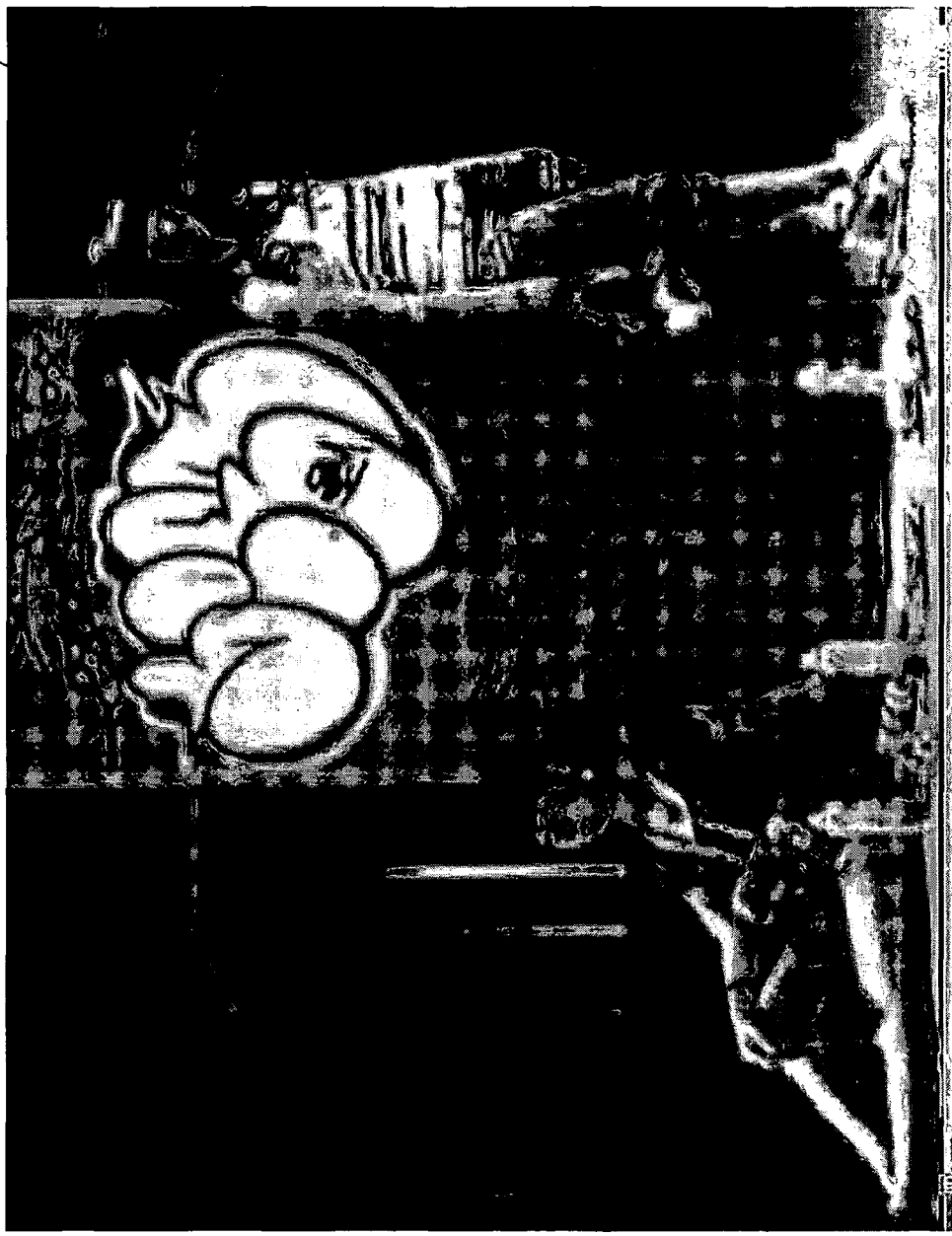
FIG. 6 is a screen illustration showing how the media player illustrated in FIG. 5 may present an alert icon when a current or future playback stall is identified.

FIG. 6 is a screen illustration showing how media player 270 may present an alert icon 280 when a current or future playback stall is identified. In the manner described above, media player 270 may identify a current or future playback stall in the presentation of the video clip. When media player 270 so identifies a current or future playback stall in the presentation of the video clip, media player 270 may present alert icon 280. Alert icon 280 may draw the attention of user 16 to the fact that media player 270 has identified a viewing event. The viewing event may be a current or future playback stall in the presentation of the video clip. In some embodiments, alert icon 280 may draw the attention of user 16 to the fact that media player 270 has identified some other viewing event.

Media player 270 may also display alert icon 280 for a variety of other reasons aside from the identification of a current or future playback stall in the presentation of the video clip. For example, media player 270 may display alert icon 280 when the user is required to provide payment in order to view the remainder of the video clip. In another example, media player 270 may display alert icon 280 when media player 220 is unable to decode the video clip.

Media player 270 may use a variety of techniques to draw the attention of user 16 to alert icon 280. For example, media player 270 may cause the exclamation point within alert icon 280 to flash. In another example, when media player 270 first presents alert icon 280, media player 270 may cause client device 6 to play a sound (e.g., a chirp, a click, a user-defined sound, etc.).

Figure 7:
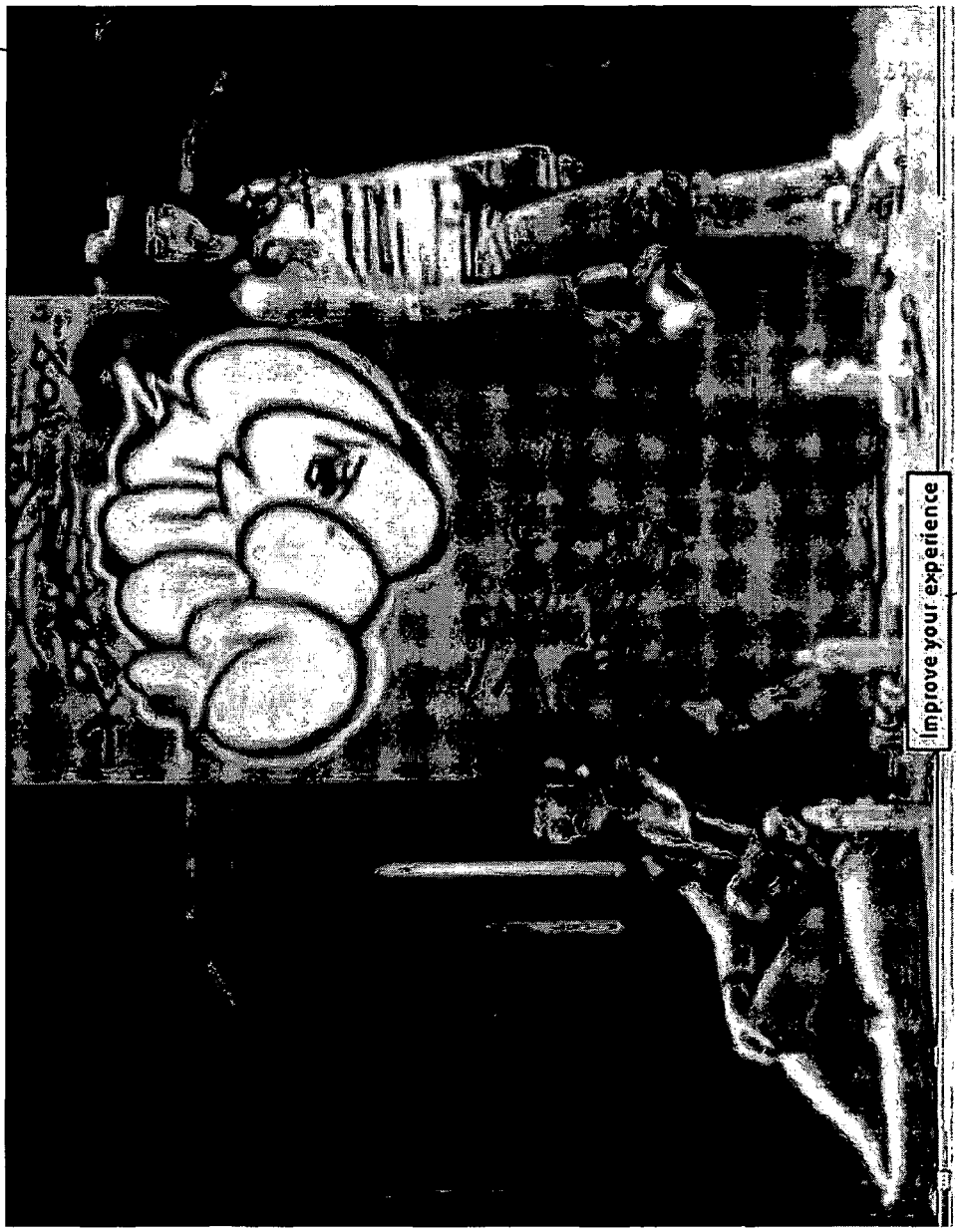
FIG. 7 is a screen illustration showing an effect of positioning a cursor over the alert icon illustrated in FIG. 6.

FIG. 7 is a screen illustration showing an effect of positioning a cursor 290 over alert icon 280 (FIG. 6). As illustrated in the example of FIG. 7, user 16 may use cursor 290 to interact with media player 270. User 16 may control the position of cursor 290 relative to media player 270 using a mouse, a trackball, a keyboard, a stylus, a touch sensitive surface, or another type of user input mechanism.

When media player 270 has displayed alert icon 280 and user 16 has positioned cursor 290 over alert icon 280, media player 270 may display a message 292. Because media player 270 may display alert icon 280 for a variety of reasons, message 292 may inform user 16 about the nature of alert icon 280. In the example of FIG. 7, message 292 informs you (i.e., user 16) that you can "improve your experience" by selecting alert icon 230. User 16 may, for example, select alert icon 280 by clicking a mouse button when cursor 290 is positioned over alert icon 280.

Figure 8:
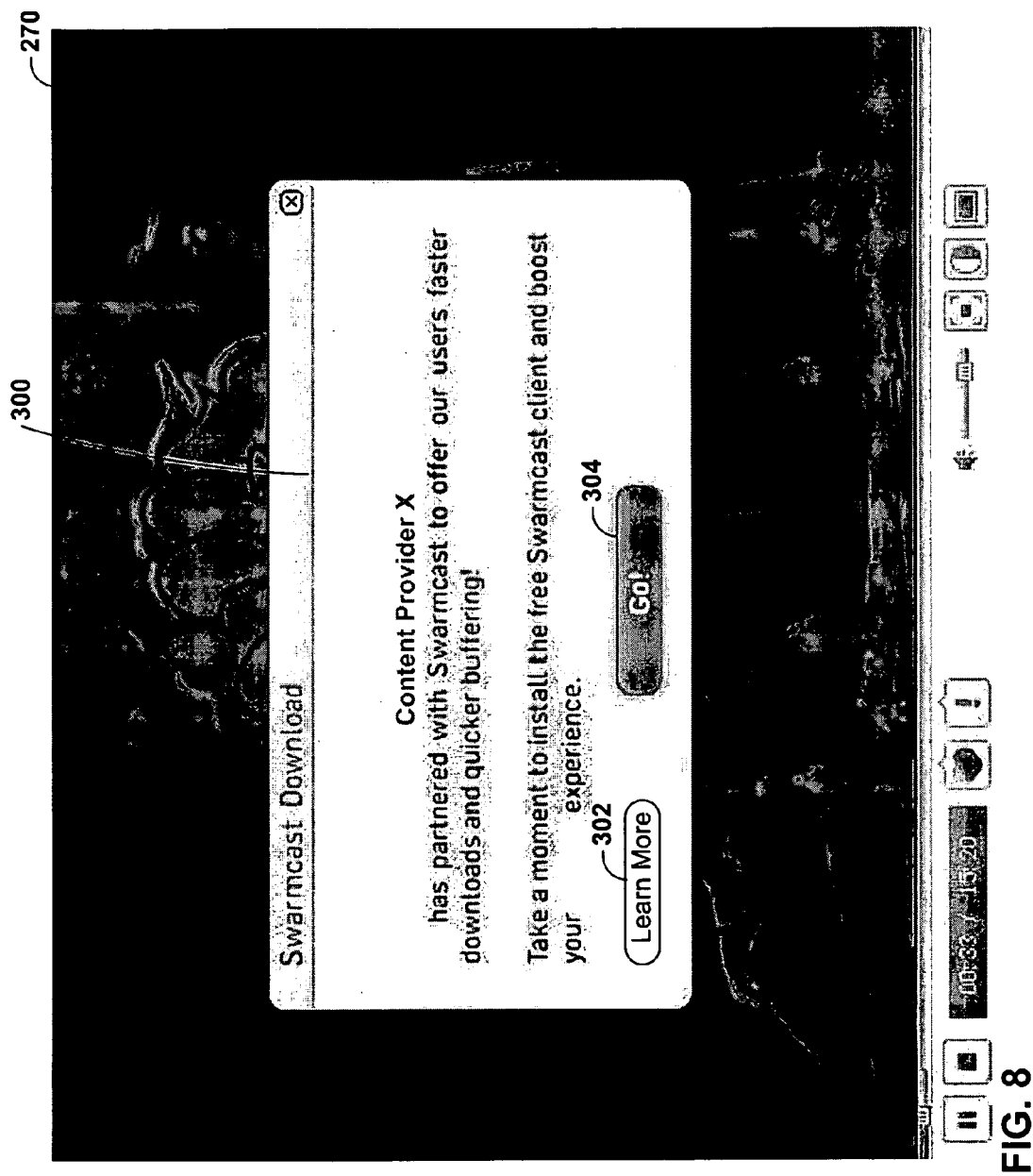
FIG. 8 is a screen illustration showing an exemplary alert window that may be displayed when the user selects the alert icon illustrated in FIG. 6.

FIG. 8 is a screen illustration showing an exemplary alert window 300 that may be displayed when user 16 selects alert icon 280 (FIG. 6). If user 16 selects alert icon 280, media player 270 may present alert window 300. Alert window 300 provides a more complete description of how user 16 may act to improve its experience. In the example of FIG. 8, alert window 300 indicates to user 16 that "Context Provider X has partnered with Swarmcast to offer our users faster downloads and quicker buffering!" Furthermore, alert window 300 requests that user 16, "Take a moment to install the free Swarmcast client and boost your experience." In the example of FIG. 8, "Swarmcast" is an exemplary provider of plug-in module 42 and the "Swarmcast client" may be an exemplary trade name for plug-in module 42.

Alert window 300 also includes a "Learn More" button 302. If user 16 selects "Learn More" button 302, media player 270 may present a user interface that presents information regarding the "Swarmcast client." For instance, when user 16 selects "Learn More" button 302, media player 270 may instruct web browser application 14 to cause client device 6 to display a new web browser window that presents a web page that describes the "Swarmcast client."

In addition, alert window 300 includes a "Go!" button 304. When user 16 selects "Go!" button 304, media player 270 may cause client device 6 to begin downloading and installing plug-in module 42. Media player 270 may cause client device 6 to begin downloading and installing the "Swarmcast client" by invoking one or more functions programmed in JavaScript or some other programming language. In addition, when user 16 selects "Go!" button 304, media player 270 may present a window (not shown) that prompts user 16 to consent to or refuse consent to an end-user license agreement.

Figure 9:
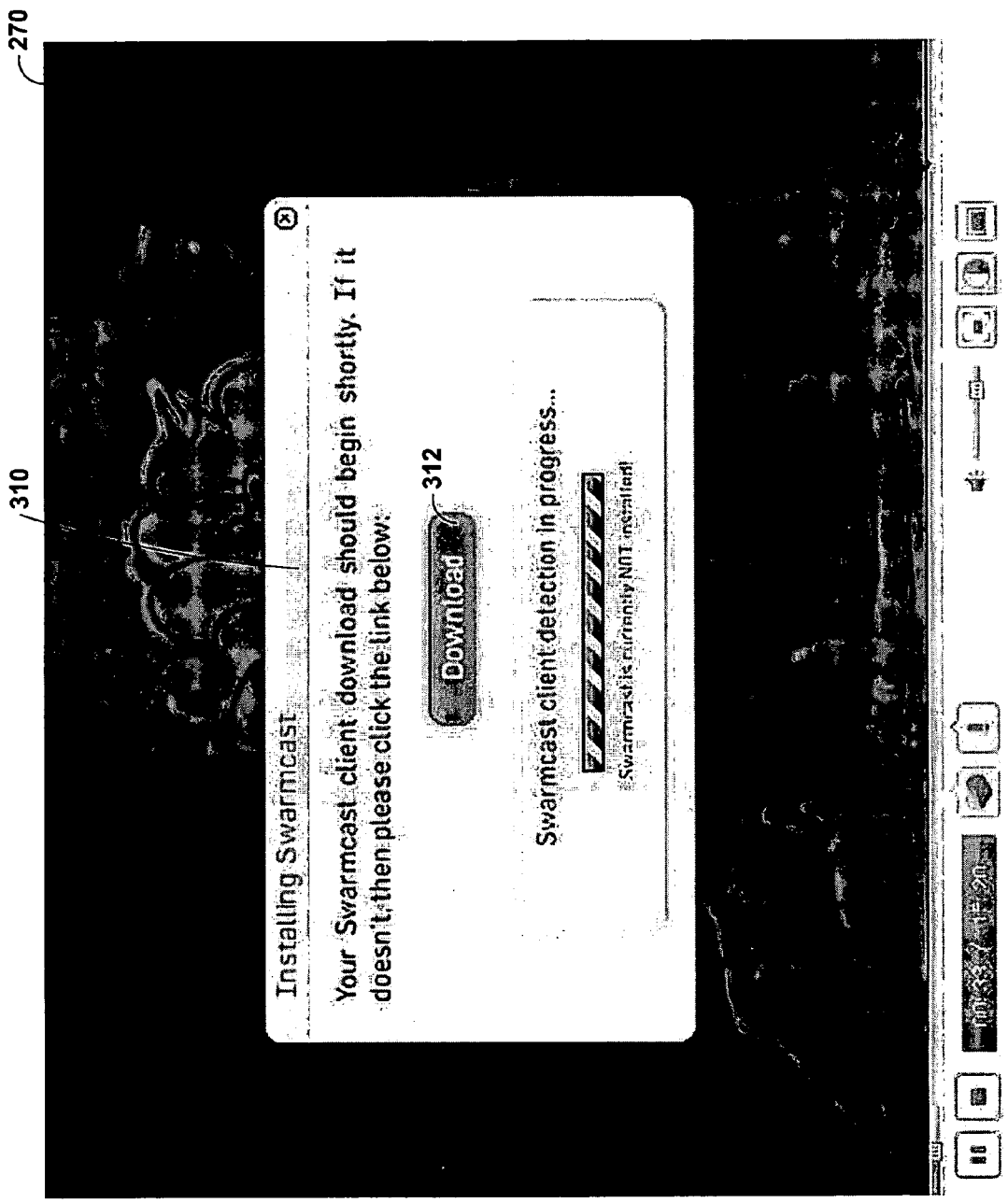
FIG. 9 is a screen illustration showing an exemplary plug-in download window.

FIG. 9 is a screen illustration showing an exemplary plug-in download window 310. Media player 270 may present plug-in download window 310 when user 16 selects "Go!" button 304. Plug-in download window 310 presents a message that informs user 16 that "Your Swarmcast client download should begin shortly. If it doesn't, then please click the link below." Furthermore, in the example of FIG. 9, plug-in download window 310 includes a "Download" button 312. If user 16 selects "Download" button 312, media player 270 may immediately begin to download and install the "Swarmcast client."

After client device 6 begins downloading the "Swarmcast client", media player 270 may determine whether installation of the "Swarmcast client" is complete by periodically checking whether the "Swarmcast client" has been installed. For instance, media player 270 may check every two seconds whether the "Swarmcast client" has been installed.

Figure 10:
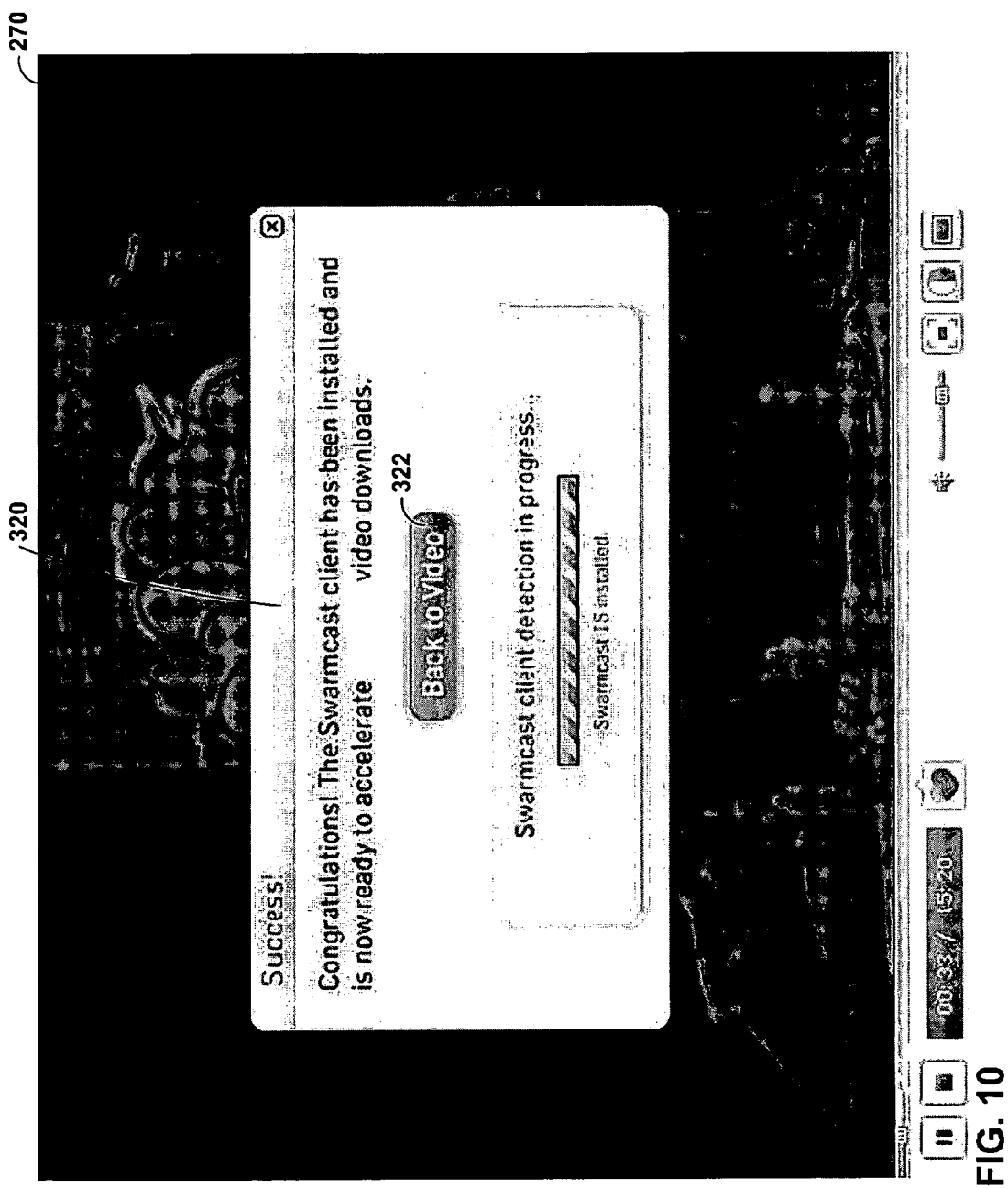
FIG. 10 is a screen illustration showing an exemplary window that is presented when the plug-in has been installed.

FIG. 10 is a screen illustration showing an exemplary window 320 that media player 270 presents when a plug-in module has been installed. As illustrated in the example of FIG. 10, media player 270 may present window 320 when the "Swarmcast client" has been successfully installed. Furthermore, in the example of FIG. 10, window 320 includes a "Back to Video" button 322. When user 16 selects "Back to Video" button 322, media player 270 may resume playing back the video clip. However, media player 270 may use the "Swarmcast client" to receive the video clip.

Figure 11:
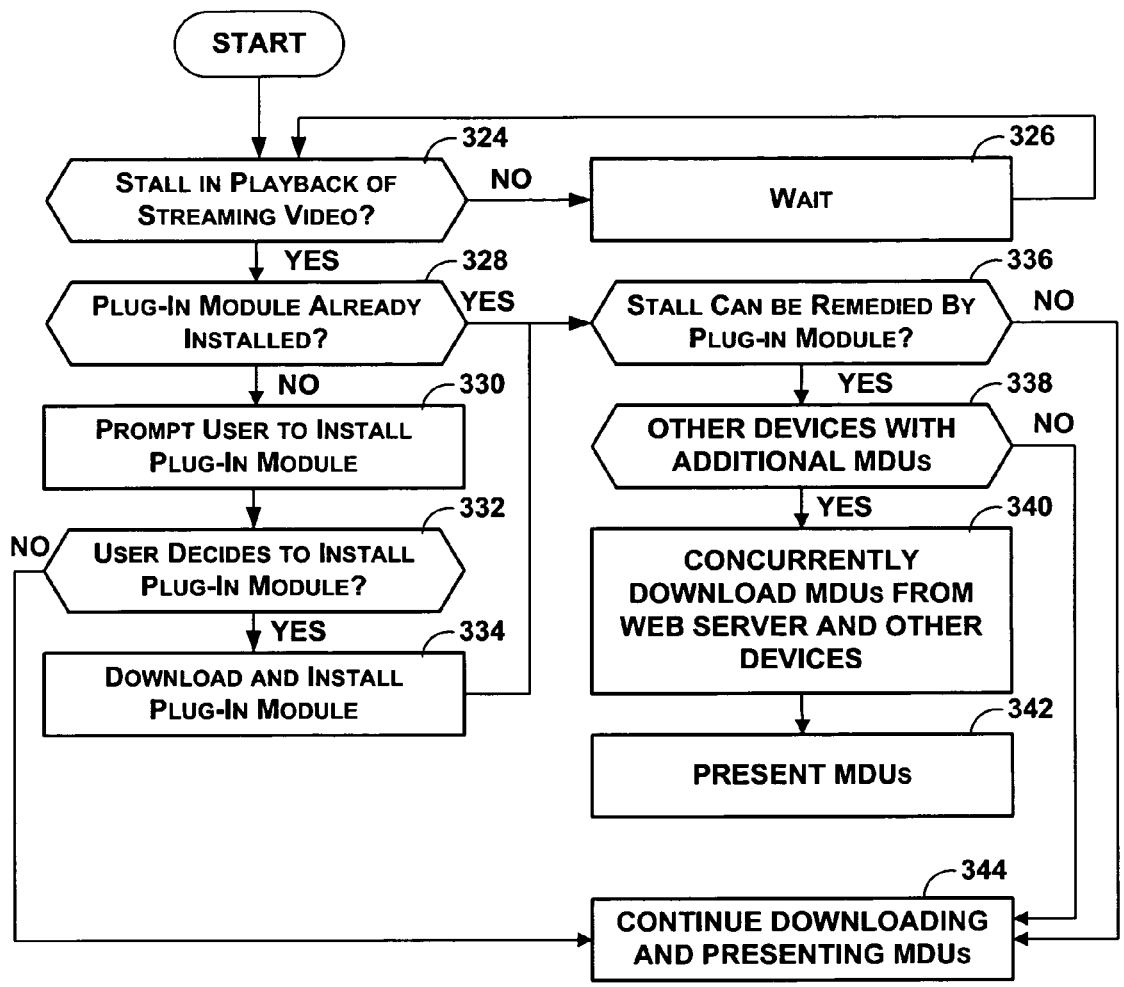
FIG. 11 is a flowchart illustrating a fourth exemplary operation of the media player.

FIG. 11 is a flowchart illustrating a fourth additional exemplary operation of media player 18 (FIG. 2) where the viewing event is a playback stall. In accordance with this exemplary operation, stall detection and prediction module 38 in media player 18 may automatically attempt to identify an occurrence of a playback stall in the presentation of an initial version of the media object (324). Stall detection and prediction module 38 may, for instance, determine whether there is currently a playback stall in the media object or whether there is likely to be a playback stall in the media object in the near future. If stall detection and prediction module 38 does not identify a playback stall of the presentation of the media data in the media object ("NO" of 324), stall detection and prediction module 38 may wait a given period of time (326). After waiting the given period of time, stall detection and prediction module 38 may loop back and again attempt to identify a playback stall of the presentation of the media data in the media object (324).

If stall detection and prediction module 38 identifies a playback stall in the presentation of the media data in the media object ("YES" of 324), installation determination module 39 may determine whether plug-in module 42 is already installed in media player 18 (328). If installation determination module 39 determines that plug-in module 42 is already installed in media player 18 ("YES" of 328), plug-in module 42 may determine whether the stall is attributable to a cause that plug-in module 42 can remedy (336). In other words, plug-in module 42 may determine whether plug-in module 42 is configured to use a download acceleration technique to download the initial version of the media object at a transfer rate that is sufficient to prevent future playback stalls in the playback of the initial version of the media object. If plug-in module 42 determines that the playback stall is attributable to a cause that plug-in module 42 cannot remedy ("NO" of 336), plug-in module 42 may download, and media playback module 36 may present, subsequent media data in the initial version of the media object (344).

On the other hand, if plug-in module 42 determines that the playback stall is attributable to a cause the plug-in module 42 can remedy ("YES" of 336), plug-in module 42 determines whether there are other devices, such devices 8A-8N, that have different MDUs that client device 6 has yet to download from web server 10 (338). If there are other devices 8 that have not downloaded MDUs that client device 6 has yet to download ("NO" of 338), plug-in module 42 may download, and media playback module 36 may present, subsequent media data in the initial version of the media object (344).

If there are other devices 8 that have downloaded MDUs that client device 6 has yet to download ("YES" of 338), plug-in module 42 may download MDUs from one or more devices 8 concurrently while downloading from web server 10 (340). Media playback module 36 may then present the MDUs that were downloaded from web server 10 and devices 8 (342).

On the other hand, if installation determination module 39 determines that plug-in module 42 is not already installed ("NO" of 328), installation determination module 39 may cause client device 6 to prompt user 16 to decide whether to download and install plug-in module 42 (330). Installation determination module 39 may then determine whether user 16 decided to download and install plug-in module 42 (332). If user 16 decides not to download and install plug-in module 42 ("NO" of 332), default media input module 32 may download, and media playback module 36 may present, subsequent media data in the initial version of the media object (344). If user 16 decides to download and install plug-in module 42 ("YES" of 332), plug-in download module 40 downloads and installs plug-in module 42 (334). Subsequently, plug-in module 42 may determine whether plug-in module 42 can remedy the playback stall (336), and so on.

Figure 12:
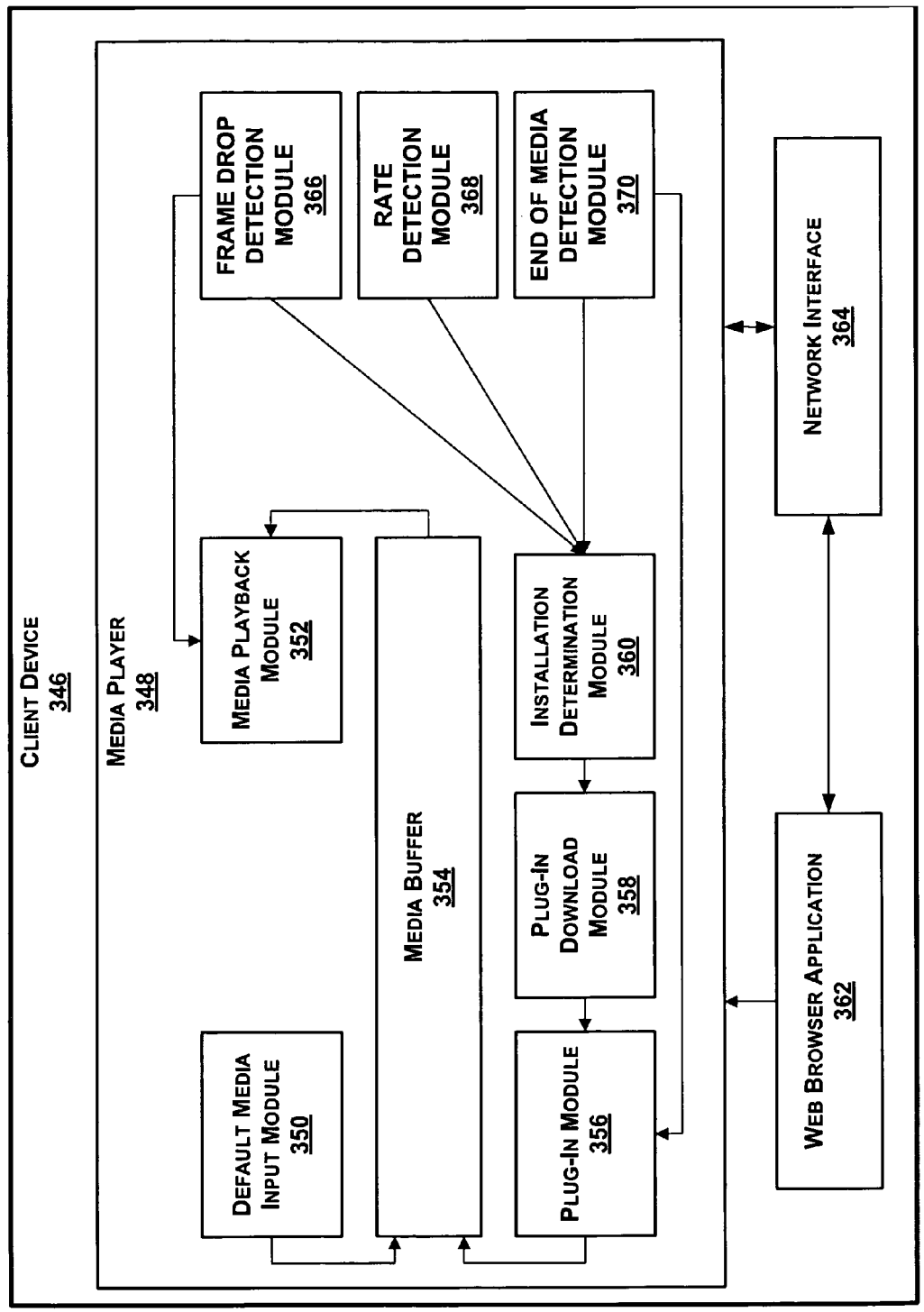
FIG. 12 is another block diagram illustrating exemplary details of a second client device.

FIG. 12 is a block diagram illustrating exemplary details of client device 346. Client device 346 may be substantially similar client device 6 (FIG. 2). In the example of FIG. 12, client device 346 includes media player 348, web browser 362, and network interface 364. Web browser 362 is substantially similar to web browser 14 (FIG. 2) and network interface 364 is substantially similar to network interface 30 (FIG. 2).

Media player 348 includes default media input module 350, media playback module 352, and media buffer 354. Default media input module 350 is substantially similar to default media input module 32 (FIG. 2). Media playback module 352 is substantially similar to media playback module 36 (FIG. 2). Media buffer 354 is substantially similar to media buffer 34 (FIG. 2).

In the example of FIG. 12, media player 348 includes frame drop detection module 366, rate detection module 368, and end of media detection module 370, the functionality of all is explained in detail below. In some embodiments, media player 348 may also include full screen activation module 44 (FIG. 2), stall detection and prediction module 38 (FIG. 2), and skip-ahead detection module 46 (FIG. 2). For clarity, these modules shown in FIG. 2 are not shown in FIG. 12. Suffice to say, in some embodiments, media player 348 may include the modules shown in FIG. 12 and FIG. 2.

Additionally, in the example of FIG. 12, media player 348 includes installation module 360, plug-in download module 358, and plug-in module 356. The functionality of each is described below. In embodiments where media player 348 includes full-screen activation module 44, stall detection and prediction module 38, and skip-ahead detection module 46, installation determination module 360, plug-in download module 358, and plug-in module 356 perform the functions described below and the functions of installation determination module 39, plug-in download module 40, and plug-in module 42 as described with respect to FIGS. 2, 3A-3F, and 11.

In the example of FIG. 12, media player 348 includes a frame drop detection module 366. While media playback module 352 is presenting MDUs in media buffer 354, frame drop detection module 366 automatically attempts to identify an occurrence when media player 348 drops frames of MDUs stored in media buffer 354. In the context of video, each MDU typically contains a plurality of video frames encoded in accordance with a video compression scheme. One type of frame is referred to as an intra frame that can be decoded without reference to other frames and may, for example, provide an entire encoded picture. In the context of H.264 coding, intra frames are referred to as "i-frames." Between each i frame are predicted pictures or bi-predicted pictures that generally contain image data and motion vector displacements that are relative to the previous i frame in the media file.

In some instances, client device 346 may be overloaded while media player 348 is displaying the MDUs. For example, user 16 may be executing various other software programs while media player 348 displays the MDUs. These various executing software programs may monopolize the processing capabilities of client device 346. Conventionally, in media players that do not include plug-in module 356, the media player drops certain frames of the MDUs while displaying the MDUs when the client device is overloaded. For instance, the media player may be displaying the MDUs at 30 frames per second (fps), and then due to processor loading caused by various other software programs, the media player, as one example, may display every other frame so that the media player is displaying the MDUs at 15 fps. There may be situations, other than when client device 346 is overloaded, when the media player may drop frames while displaying the MDUs.

Notably, frames per second should not be confused with playback rate. For instance, there is a first version of MDUs that are encoded for a playback rate of 30 kilobytes per second, and a second version of MDUs that are encoded for a playback rate of 300 kilobytes per second. Each version of MDUs is encoded to be displayed at 30 fps. Therefore, each frame of the first version includes 1 kilobyte of data (30 kilobytes per second divided by 30 frames per second), and each frame of the second version includes 10 kilobytes of data (300 kilobytes per second divided by 30 frames per second). If media player 348 is displaying the second version, but dropping every other frame, i.e. displaying at 15 fps, the second version is still encoded for 300 kilobytes per second playback rate, and each frame still includes 10 kilobytes of data; however, media player 348 is dropping every other frame, and therefore displaying at 150 kilobytes per second.

Frame drop detection module 366 determines when media player 348 is dropping frames while displaying the MDUs. In instances where media player 348 is dropping frames as determined by frame drop detection module 366, installation determination module 360 in media player 348 may determine whether the frame dropping is attributable to a cause that a plug-in module 356 is able to remedy. For instance, installation determination module 360 may determine that the frame dropping may be remedied by downloading versions of MDUs that are encoded for a lower playback rate than the playback rate of the current version begin downloaded.

Upon a viewing event, where frame drop detection module 366 determines media player 348 is dropping frames of the MDUs and installation determination module 360 determines that the frame dropping can be remedied by plug-in module 356, installation determination module 360 determines whether plug-in module 356 is already installed on client device 346. If plug-in module 356 is not installed on client device 346, installation determination module 360 may prompt user 16 to download plug-in module 356, as described above with respect to FIG. 2. User 16 then determines whether to download plug-in module 356. If user 16 chooses to download plug-in module 356, plug-in download module 358 causes network interface 364 to download and install plug-in module 356 from download server 12 (FIG. 1). If plug-in module 356 is already installed on client device 346, no further action may be necessary.

After plug-in module 356 is installed on client device 346, plug-in module 356 may determine whether there are versions of MDUs that are encoded for a lower playback rate than the playback rate of the current version of MDUs. If there are versions of MDUs with lower playback rate, plug-in module 356 determines which version is optimum such that media player 348 will not drop frames while media playback module presents the MDUs. If no such version exists, no further action may be necessary.

Plug-in module 356 may begin downloading the determined version of MDUs from the instance when frame drop detection module 366 determined that media player 348 is dropping frames. Media buffer 354 begins storing MDUs associated with the determined version of MDUs, and subsequently, media playback module 352 displays the determined version of MDUs.

As shown in FIG. 12, media player 348 also includes rate detection module 368. In some instances, client device 346 receives MDUs at a transfer rate that is at least a defined threshold higher than a playback rate of the media data units. For example, client device 346 may receive MDUs at a transfer rate of 10 megabytes/second that are encoded for a playback rate of 5 megabytes/second. In some embodiments, the defined threshold may be a percentage value, such as 20%. For example, in some embodiments, rate detection module 368 may indicate that the transfer rate is higher than a defined threshold if the transfer rate is 20% higher than the playback rate. A defined threshold of 20% is just one example. The defined threshold may be greater than or less than 20%. Additionally, the defined threshold need not be a percentage, and could be a fixed value such as 5 megabytes/second. For example, if the transfer rate is 5 megabytes/second higher than the playback rate, rate detection module 368 may indicate that the transfer rate is higher than a defined threshold. Again, a defined threshold of 5 megabytes/second is just one example. The defined threshold may be greater than or less than 5 megabytes/second.

In such instances where the transfer rate of the MDUs is at least a defined threshold higher than the playback rate of the MDUs, client device 346 may be able to receive MDUs that are encoded with a higher playback rate without risking a playback stall. Generally, MDUs encoded for a higher playback rate provide better visual quality when displayed compared to MDUs encoded for a lower playback rate. This is because MDUs encoded for a higher playback rate display more visual data bits in one second compared to MDUs encoded for a lower playback rate. In instances where the transfer rate is at least a defined threshold higher than the playback rate of the MDUs, it may be beneficial to present user 16 with MDUs that are encoded for a higher playback rate because the MDUs encoded for a higher playback rate provide higher visual quality MDUs.

Rate detection module 368 determines when the transfer rate is at least a defined threshold higher than the current playback rate of the MDUs. In instances where the transfer rate is at least a defined threshold higher than the playback rate, installation determination module 360 determines whether plug-in module 356 is installed on client device 346. If plug-in module 356 is not installed on client device 346, user 16 may be prompted to download plug-in module 356. If user 16 chooses to download plug-in module 356, plug-in download module 358 downloads and installs plug-in module 356 as described above.

After plug-in module 356 is installed on client device 346, plug-in module 356 determines whether there are versions of MDUs that are encoded for a playback rate that is greater than the playback rate of the current version of MDUs and/or substantially equal to, but not greater than, the transfer rate at which client device 346 is downloading the MDUs. If there is a version of MDUs that are encoded for a playback rate that is substantially equal to, but not greater than, the transfer rate, plug-in module 356 may download the determined version of MDUs from the instance that rate detection module 368 determined that the transfer rate is at least a defined threshold higher than the playback rate of the MDUs.

As shown in FIG. 12, media player 348 includes end of media detection module 370. End of media detection module 370 determines when user 16 has finished viewing the media object. After end of media detection module 370 determines that user 16 has finished viewing the media object, installation determination module 360 determines whether plug-in module 356 is installed on client device 346. If plug-in module 356 is not installed on client device 346, installation determination module 360 prompts user 16 to download plug-in module 356. If user 16 selects to download plug-in module 356, plug-in download module 358 downloads and installs plug-in module 356 as described above.

If plug-in module 356 is already installed on client device 346, no action is necessary. Also, if user 16 selects not to download plug-in module 356, no further action may be necessary.

Figure 13A:
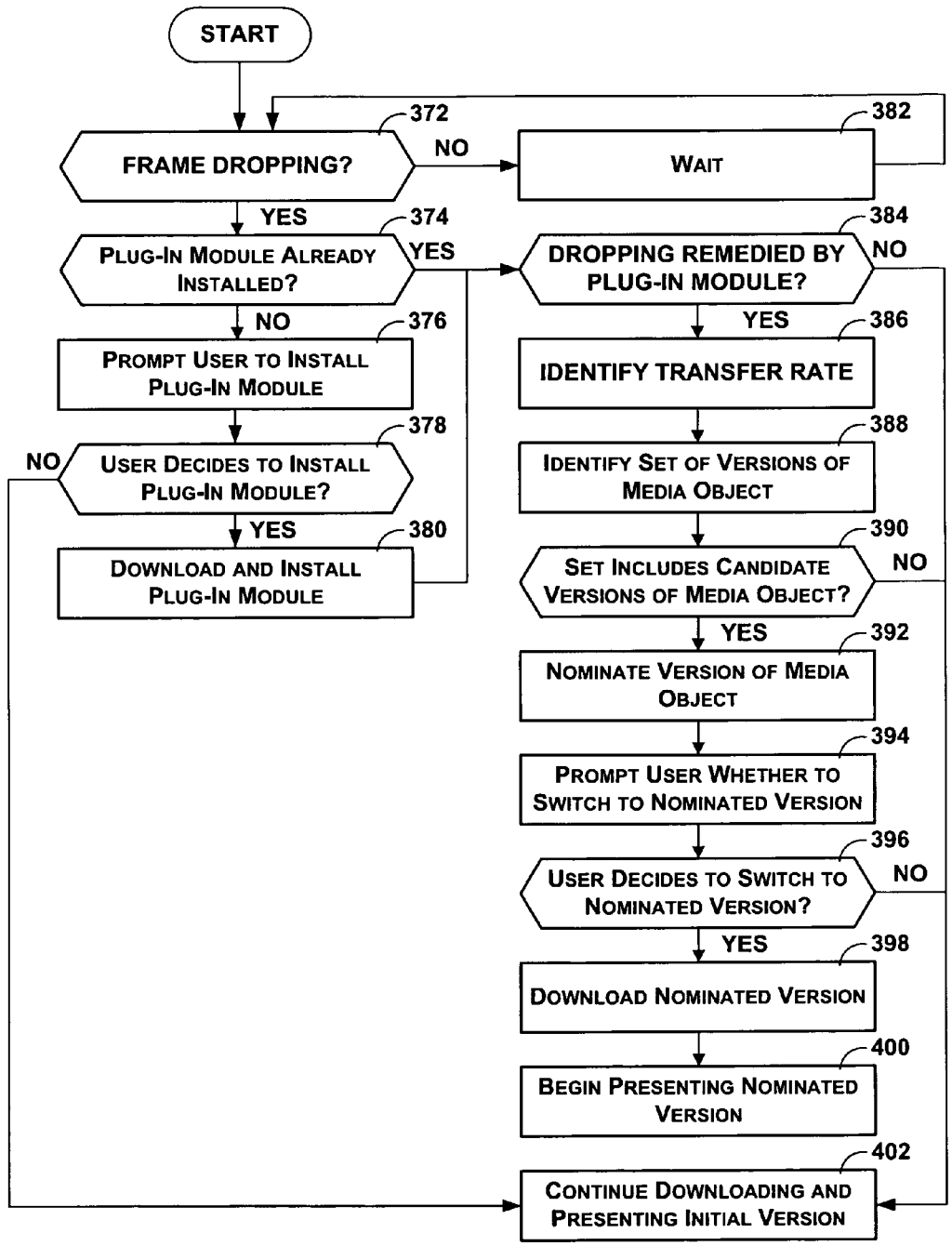
FIG. 13A is a flowchart illustrating a first exemplary operation of a second media player illustrated in the example of FIG. 12.
Figure 13B:
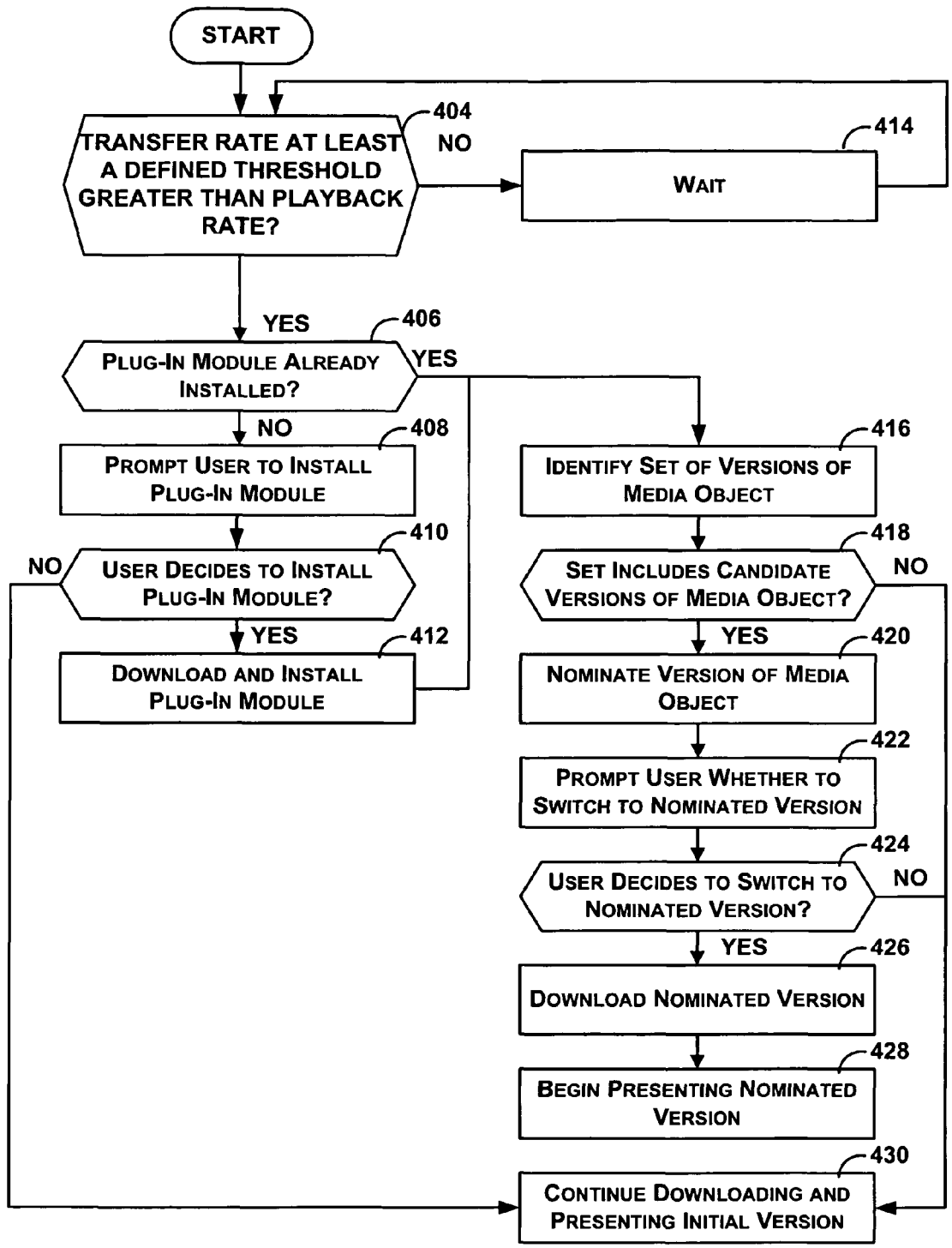
FIG. 13B is a flowchart illustrating a second exemplary operation of a second media player illustrated in the example of FIG. 12.
Figure 13C:
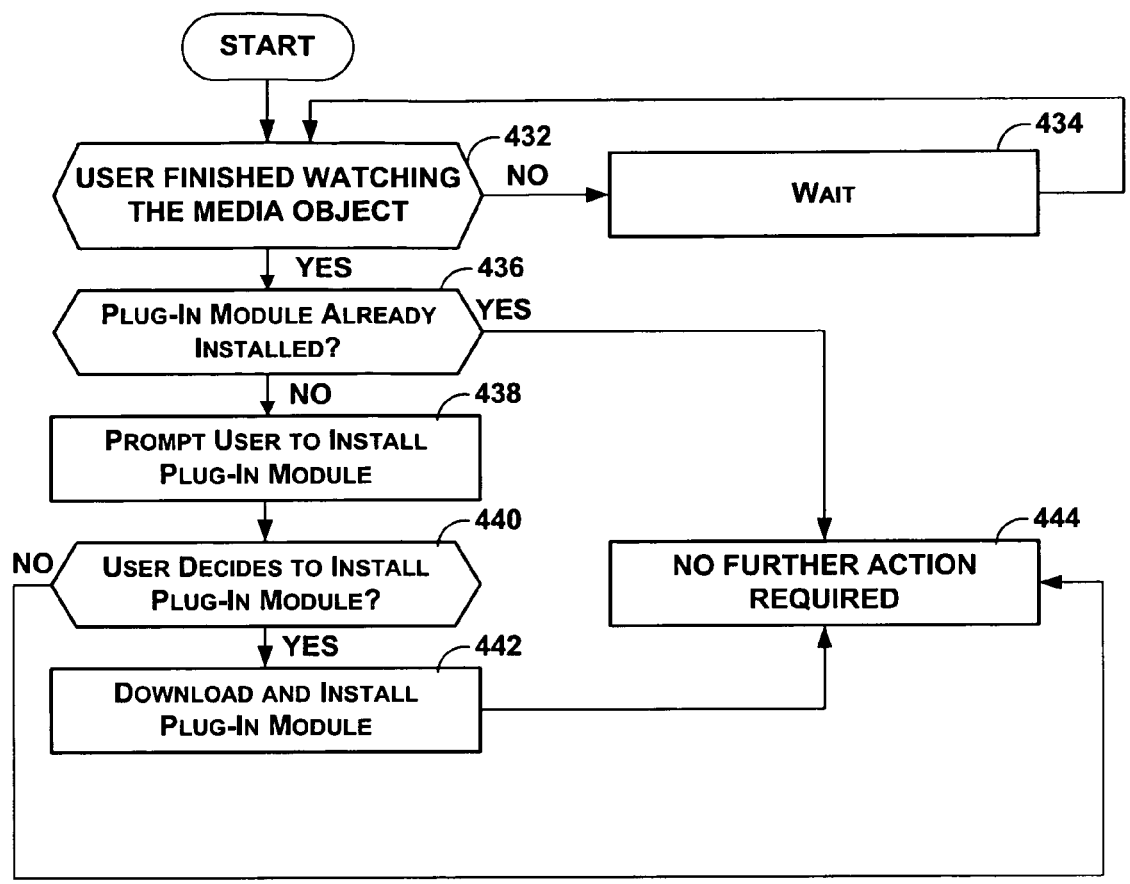
FIG. 13C is a flowchart illustrating a third exemplary operation of a second media player illustrated in the example of FIG. 12.

FIGS. 13A-13C are flowcharts illustrating exemplary operations of modules in media player 348 of client device 346 (FIG. 12). It should be appreciated that the exemplary operations illustrated in the examples of FIGS. 13A-13C are merely exemplary operations and that many other operations are possible and within the scope of this disclosure.

FIG. 13A is a flowchart illustrating a first exemplary operation of media player 348 (FIG. 12), when the viewing event is frame dropping. In accordance with this exemplary operation, frame drop detection module 366 in media player 348 may automatically attempt to identify an occurrence of frame dropping in the presentation of an initial version of the media object (372). As used in this disclosure, an initial version of the media object may be the version of the media object that is initially requested by user 16. Frame drop detection module 366 determines whether media player 348 is current dropping frames or will drop frames in the future. If frame drop detection module 366 does not identify frame dropping of the media data in the media object ("NO" of 372), frame drop detection module 366 may wait a given period of time (382). After waiting the given period of time, frame drop detection module 366 may loop back and again attempt to identify frame dropping of the presentation of the media data in the media object (372).

If frame drop detection module identifies frame dropping ("YES" of 372), installation determination module 360 may determine whether plug-in module 356 is already installed in media player 348 (374). If installation determination module 360 determines that plug-in module 356 is already installed in media player 348 ("YES" of 374), plug-in module 356 may determine whether the frame dropping is attributable to a cause that plug-in module 356 can remedy (384). If plug-in module 356 determines that the playback stall is attributable to a cause that plug-in module 356 cannot remedy ("NO" of 384), plug-in module 356 may download, and media playback module 352 may present, subsequent media data in the initial version of the media object (402).

On the other hand, if plug-in module 356 determines that the frame dropping is attributable to a cause the plug-in module 356 can remedy ("YES" of 384), plug-in module 356 may identify the transfer rate between network 4 and client device 346. For example, plug-in module 356 may identify the transfer rate as 2 megabytes/second. After identifying the transfer rate, plug-in module 356 may identify a set of versions of the media object that are available for download (388). For example, plug-in module 356 may determine that there are three versions of a media object available for download: a version having a playback rate of 500 kilobytes/second, a version having a playback rate of 1 megabyte/second, and a version having a playback rate of 3.0 megabytes/second. Next, installation determination module 360 may determine whether the set of versions of the media object includes one or more candidate versions of the media object (390). "Candidate" versions of the media object are versions of the media object that can be downloaded without the occurrence of frame dropping. To avoid frame dropping the playback rate of the candidate versions of the media object will be less than the playback rate of the initial version of the media object. For example, if media player 348 is dropping every other frame, candidate version of the media object may be versions that are encoded for a playback rate that is less than or equal to half the current transfer rate. Continuing the previous example, if the transfer rate is 2 megabytes/second, plug-in module 356 identifies the version having the playback rate of 500 kilobytes/second and the version having the playback rate of 1 megabyte/second as candidate versions of the media object because these versions are less than or equal to half the transfer rate. If the set of versions of the media object does not include a candidate version of the media object ("NO" of 390), plug-in module 356 may download, and media playback module 352 may present, subsequent media data in the initial version of the media object (402).

If the set of versions of the media object includes one or more candidate versions of the media object ("YES" of 390), plug-in module 356 may nominate one of the candidate versions of the media object (392). The nominated one of the candidate versions of the media object may be the one of the candidate versions that has the highest audio/video quality. For example, if the candidate versions of the media object include the version having a playback rate of 1 megabyte/second and the version having a playback rate of 500 kilobytes/second, and the transfer rate is 2 megabytes/second, plug-in module 356 may nominate the version having a playback rate of 1 megabyte/second because the version having a playback rate of 1 megabyte/second is likely to have higher audio/video quality than the version having a playback rate of 500 kilobytes/second.

After nominating a version of the media object, plug-in module 356 may prompt user 16 to decide whether to switch from the initial version of the media object to the nominated version of the media object (394). When plug-in module 356 prompts user 16 to decide whether to switch from the initial version of the media object to the nominated version of the media object, plug-in module 356 may indicate to user 16 that user 16 may be required to pay a tariff in order to cause the subsequent media data in the nominated version of the media object to be presented. Next, plug-in module 356 may determine whether user 16 has decided whether to switch from the initial version of the media object to the nominated version of the media object (396). If plug-in module 356 determines that user 16 has decided not to switch from the initial version of the media object to the nominated version of the media object ("NO" of 396), plug-in module 356 may download, and media playback module 352 may present, subsequent media data in the initial version of the media object (402).

If plug-in module 356 determines that user 16 has decided to switch from the initial version of the media object to the nominated version of the media object ("YES" of 396), plug-in module 356 may begin downloading the nominated version of the media object (398). Media playback module 352 may then start presenting the nominated version of the media object from the current location of the media object (400). In other words, media playback module 352 presents media data that occurs subsequent to the media data of the initial version that has already been presented. For example, if media player 348 has already presented the first five minutes of initial version of the media object, media player 348 may begin presenting the nominated version of the media object from the fifth minute of the nominated version of the media object onward. In this way, media player 348 begins presenting the nominated version of the media object from a point at which media player 348 left off presenting the initial version of the media object.

On the other hand, if installation determination module 360 determines that plug-in module 356 is not already installed ("NO" of 374), installation determination module 360 may cause client device 346 to prompt user 16 to decide whether to download and install plug-in module 356 (376). Installation determination module 360 may then determine whether user 16 decided to download and install plug-in module 356 (378). If user 16 decides not to download and install plug-in module 356 ("NO" of 378), default media input module 350 may download, and media playback module 352 may present, subsequent media data in the initial version of the media object (402). If user 16 decides to download and install plug-in module 356 ("YES" of 378), plug-in download module 358 downloads and installs plug-in module 356 (380). Subsequently, plug-in module 356 may determine whether plug-in module 356 can remedy the frame dropping (384), and so on.

FIG. 13B is a flowchart illustrating a second exemplary operation of media player 348 (FIG. 12), when the viewing event is that the transfer rate is at least a defined threshold higher than the playback rate. In accordance with this exemplary operation, rate detection module 368 in media player 348 may automatically attempt to identify an occurrence when the transfer rate is at least a defined threshold higher than the playback rate of the initial version of the media object (404). If rate detection module 368 does not identify that the transfer rate is at least a defined threshold higher than the playback rate ("NO" of 404), rate detection module 368 may wait a given period of time (414). After waiting the given period of time, rate detection module 368 may loop back and again attempt to identify frame dropping of the presentation of the media data in the media object (404).

If rate detection module 368 determines that the transfer rate is much greater than the playback rate ("YES" of 404), installation determination module 360 may determine whether plug-in module 356 is already installed in media player 348 (406). If installation determination module 360 determines that plug-in module 356 is already installed in media player 348 ("YES" of 406), plug-in module 356 may identify a set of versions of the media object that are available for download (416). For example, plug-in module 356 may determine that there are three versions of a media object available for download: a version having a playback rate of 500 kilobytes/second, a version having a playback rate of 1 megabyte/second, and a version having a playback rate of 2 megabytes/second. Next, installation determination module 360 may determine whether the set of versions of the media object includes one or more candidate versions of the media object (418). "Candidate" versions of the media object are versions of the media object that are encoded for a playback rate that is substantially equal to the transfer rate. Continuing the previous example, if the transfer rate is 2 megabytes/second, plug-in module 356 identifies the version having the playback rate of 2 megabytes/second because the playback rate of this version is substantially equal to the transfer rate. If the set of versions of the media object does not include a candidate version of the media object ("NO" of 418), plug-in module 356 may download, and media playback module 352 may present, subsequent media data in the initial version of the media object (430).

If the set of versions of the media object includes one or more candidate versions of the media object ("YES" of 418), plug-in module 356 may nominate one of the candidate versions of the media object (420). The nominated version may be the version that is encoded for the highest playback rate that is less than or substantially equal to the transfer rate.

After nominating a version of the media object, plug-in module 356 may prompt user 16 to decide whether to switch from the initial version of the media object to the nominated version of the media object (422). When plug-in module 356 prompts user 16 to decide whether to switch from the initial version of the media object to the nominated version of the media object, plug-in module 356 may indicate to user 16 that user 16 may be required to pay a tariff in order to cause the subsequent media data in the nominated version of the media object to be presented. Next, plug-in module 356 may determine whether user 16 has decided whether to switch from the initial version of the media object to the nominated version of the media object (424). If plug-in module 356 determines that user 16 has decided not to switch from the initial version of the media object to the nominated version of the media object ("NO" of 424), plug-in module 356 may download, and media playback module 352 may present, subsequent media data in the initial version of the media object (430).

If plug-in module 356 determines that user 16 has decided to switch from the initial version of the media object to the nominated version of the media object ("YES" of 424), plug-in module 356 may begin downloading the nominated version of the media object (426). Media playback module 352 may then start presenting the nominated version of the media object from the current location of the media object (428). In other words, media playback module 352 presents media data that occurs subsequent to the media data of the initial version that has already been presented. In this way, media player 348 begins presenting the nominated version of the media object from a point at which media player 348 left off presenting the initial version of the media object.

On the other hand, if installation determination module 360 determines that plug-in module 356 is not already installed ("NO" of 406), installation determination module 360 may cause client device 346 to prompt user 16 to decide whether to download and install plug-in module 356 (408). Installation determination module 360 may then determine whether user 16 decided to download and install plug-in module 356 (410). If user 16 decides not to download and install plug-in module 356 ("NO" of 410), default media input module 350 may download, and media playback module 352 may present, subsequent media data in the initial version of the media object (430). If user 16 decides to download and install plug-in module 356 ("YES" of 410), plug-in download module 358 downloads and installs plug-in module 356 (412). Subsequently, plug-in module 356 may identify a set of versions of the media object that are available for download (416), and so on.

FIG. 13C is a flowchart illustrating a third exemplary operation of media player 348 (FIG. 12), when the viewing event is that user 16 has finished watching the media object. In accordance with this exemplary operation, end of media detection module 370 in media player 348 may automatically identify when user 16 has finished watching the media object (432). If end of media detection module 370 does not identify that user 16 has finished viewing the media object ("NO" of 432), end of media detection module 370 may wait a given period of time (434). Notably, as used herein end of media detection module 370 identifies when the media object has been completely displayed, or when user 16 decides to prematurely stop viewing the media object.

After waiting the given period of time, end of media detection module 370 may loop back and again attempt to identify whether user 16 has finished watching the media object (432).

If user 16 has finished watching the media object ("YES" of 432), installation determination module 360 determines whether plug-in module 356 is installed on client device 346 (436). If installation determination module 360 determines that plug-in module 356 is installed on client device ("YES" of 436), no further action may be necessary (444).

On the other hand, if installation determination module 360 determines that plug-in module 356 is not already installed ("NO" of 436), installation determination module 360 may cause client device 346 to prompt user 16 to decide whether to download and install plug-in module 356 (438). Installation determination module 360 may then determine whether user 16 decided to download and install plug-in module 356 (440). If user 16 decides not to download and install plug-in module 356 ("NO" of 440), no further action may be necessary (444). If user 16 decides to download and install plug-in module 356 ("YES" of 440), plug-in download module 358 downloads and installs plug-in module 356 (442). No further action may be necessary after plug-in download module 358 downloads and installs plug-in module 356 (444).

Figure 14:
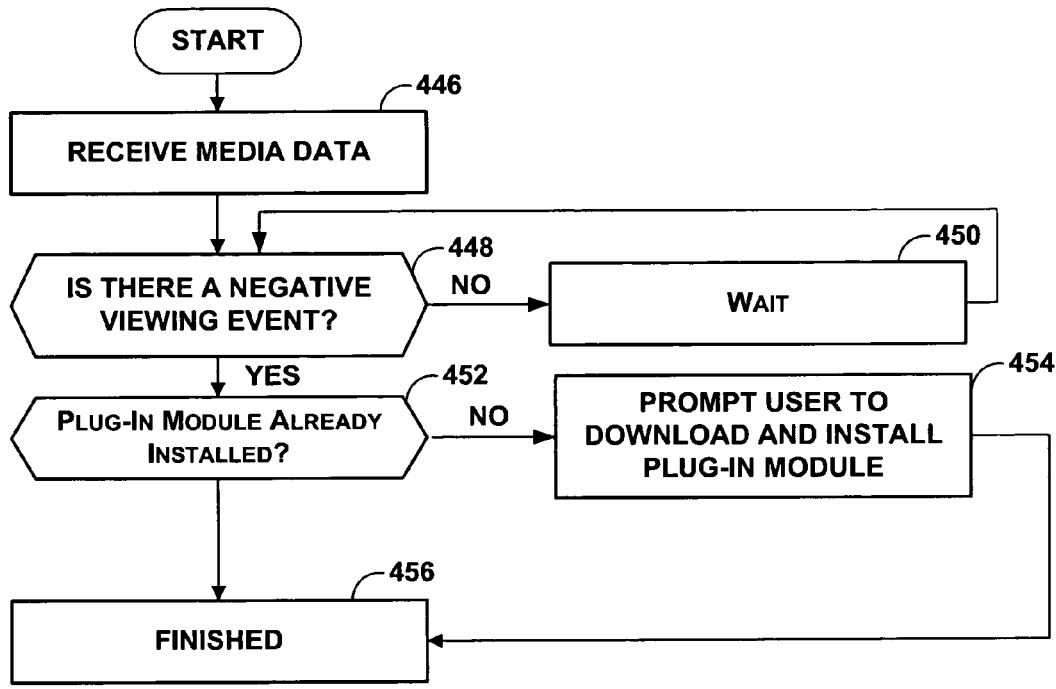
FIG. 14 is a flowchart illustrating an overall exemplary operation of the first and second media players.

FIG. 14 is a flowchart illustrating an overall exemplary operation of media player 348. For clarity reference will be made to FIGS. 2 and 12. Additionally, as described in this exemplary operation of media player 348, installation module 360 performs all the functions described above with respect to FIGS. 12 and 13A-13C and the functions of installation module 39 described above with respect to FIGS. 2 and 3A-3F. Similarly, plug-in download module 358 and plug-in module 356 perform all the functions described above with respect to FIGS. 12 and 13A-13C and the functions of plug-in download module 40 and plug-module 42, respectively, described above with respect to FIGS. 2 and 3A-3F. Also, in the exemplary operation of media player 348, media player 348 includes stall and prediction module 38, full screen activation module 44, and skip-ahead detection module 46 (shown in FIG. 2, but not shown in FIG. 12).

Media player 348 starts by displaying media data of the media object, i.e. MDUs of the media object downloaded from web server 10 (FIG. 1) (446). Next, one or more of stall detection and prediction module 38, full screen activation module 44, skip-ahead detection module 46, frame drop detection module 366, rate detection module 368, and end of media detection module 370 determine whether there is a viewing event (448). For example, stall detection and prediction module 38 may determine whether there is currently a playback stall or whether there will be a playback stall in the near future. Full screen activation module 44 may determine whether user 16 wishes to view the media data in full screen. Skip-ahead detection module 46 may determine whether user 16 wishes to skip-ahead in the media object. Frame drop detection module 366 may determine whether media player 348 is dropping frames. Rate detection module 368 may determine whether the transfer rate of the media data is much greater than the playback rate of the media data. End of media detection module 370 may determine whether user 16 has finished viewing the media data. If there is no such viewing event ("NO" of 448), stall detection and prediction module 38, full screen activation module 44, skip-ahead detection module 46, frame drop detection module 366, rate detection module 368, and end of media detection module 370 may wait a predetermined amount of time (450). After which, stall detection and prediction module 38, full screen activation module 44, skip-ahead detection module 46, frame drop detection module 366, rate detection module 368, and end of media detection module 370 may once again determine whether there is a viewing event (448).

If one or more of stall detection and prediction module 38, full screen activation module 44, skip-ahead detection module 46, frame drop detection module 366, rate detection module 368, and end of media detection module 370 determine that there is a ("YES" of 348), installation determination module 360 determines whether plug-in module 356 is already downloaded and installed on the client device (452). In some embodiments, before determining whether plug-in module 356 is already downloaded and installed, installation determination module 360 determines whether the viewing event can be remedied by plug-in module 356. If it can be remedied, then installation determination module 360 determines whether plug-in module 356 is already downloaded and installed. If it cannot be remedied, then no further action may be necessary.

If installation determination module 360 determines that plug-in module 356 is already downloaded and installed ("YES" of 452), no further action may be necessary (456). If installation determination module 360 determines that plug-in module 356 is not already downloaded and installed, installation determination module 360 may cause client device 346 to prompt user 16 to decide whether to download and install plug-in module 356 (454). In some embodiments, no further action may be required (456). In some other embodiments, if user 16, in response to the prompt (454), chooses not to download and install plug-in module 356, no further action may be necessary. If user 16, in response to the prompt (454), chooses to download and install plug-in module 356, plug-in download module 358 downloads and installs plug-in module 356.

Figure 15A:
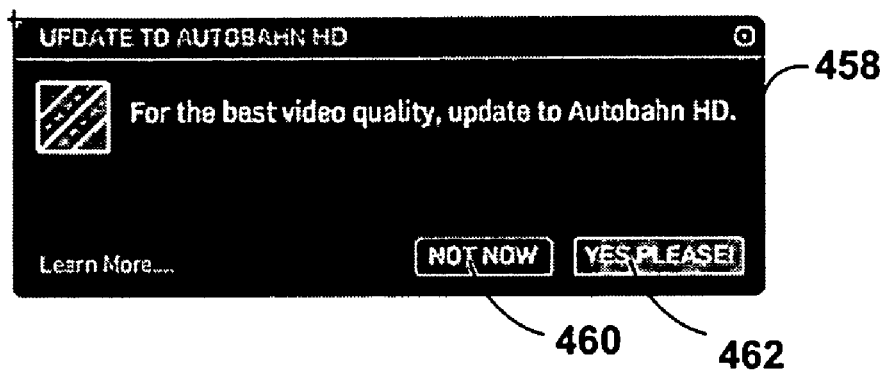
FIG. 15A is a screen illustration showing an exemplary alert window that may be displayed when at least one of a frame drop detection module, a rate detection module, and an end of media detection module determine a viewing event.

FIG. 15A is a screen illustration showing an exemplary alert window 458 that may be displayed when at least one of frame drop detection module 366, rate detection module 368, end of media detection module 370 determine a viewing event. In some embodiments, alert window 448 is the prompt that client device 346 presents user 16 as described with respect to FIGS. 13A-13C. As shown in FIG. 15A, alert window 458 states "For best quality video, update to Autobahn HD." With respect to FIG. 15A, Autobahn HD represents the executable software of plug-in module 356 (FIG. 12). If user 16 selects the not now button 450, no further action is required. If user 16 selects the yes please button 452, plug-in download module 358 downloads and installs Autobahn HD, i.e. plug-in module 356.

Figure 15B:
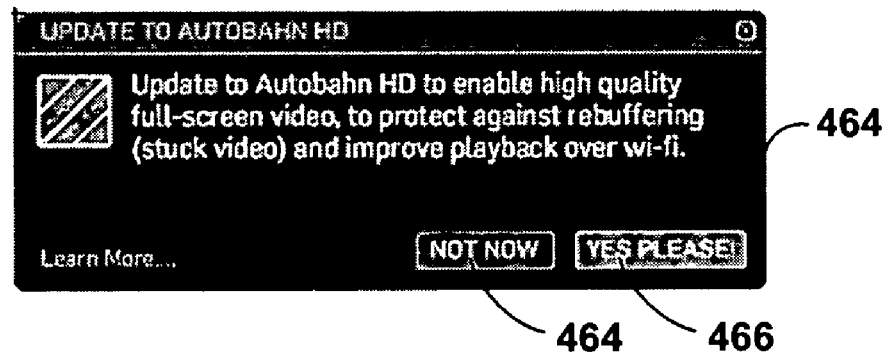
FIG. 15B is a screen illustration showing an exemplary alert window that may be displayed when a full screen activation module determines a viewing event.

FIG. 15B is a screen illustration showing an exemplary alert window 464 that may be displayed when full screen activation module 44 determines a viewing event. In some embodiments, alert window 464 is the prompt that client device 346 presents user 16 as described with respect to FIG. 3E. As shown in FIG. 15B, alert window 464 states "Update to Autobahn HD to enable high-quality full screen video, to protect against rebuffering (stuck video) and improve playback over wi-fi." Similar to FIG. 15A, with respect to FIG. 15B, Autobahn HD represents the executable software such as plug-in module 356 (FIG. 12). If user 16 selects the not now button 464, no further action is required. If user 16 selects the yes please button 466, plug-in download module 358 downloads and installs Autobahn HD, i.e. plug-in module 356.

Figure 15C:
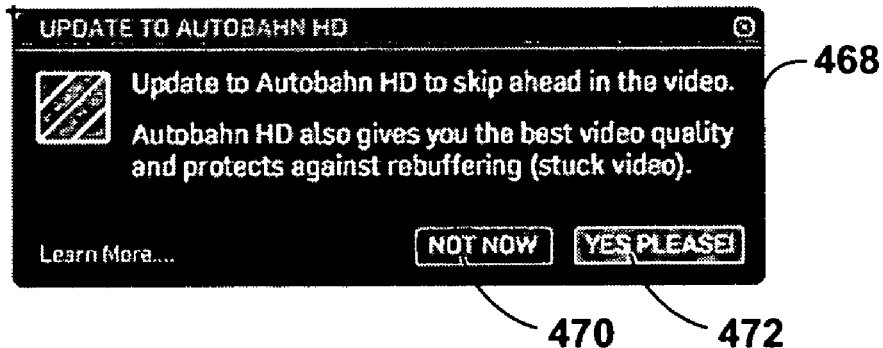
FIG. 15C is a screen illustration showing an exemplary alert window that may be displayed when a skip-ahead detection module determines a viewing event.

FIG. 15C is a screen illustration showing an exemplary alert window 468 that may be displayed when skip-ahead detection module 46 determines a viewing event. In some embodiments, alert window 468 is the prompt that client device 346 presents user 16 as described with respect to FIG. 3F. As shown in FIG. 15C, alert window 468 states "Update to Autobahn HD to skip ahead in video. Autobahn HD also gives you the best video quality and protects against rebuffering (stuck video)." Similar to FIGS. 15A and 15B, with respect to FIG. 15C, Autobahn HD represents the executable software such as plug-in module 356 (FIG. 12). If user 16 selects the not now button 470, no further action is required. If user 16 selects the yes please button 472, plug-in download module 358 downloads and installs Autobahn HD, i.e. plug-in module 356.

Figure 16A:
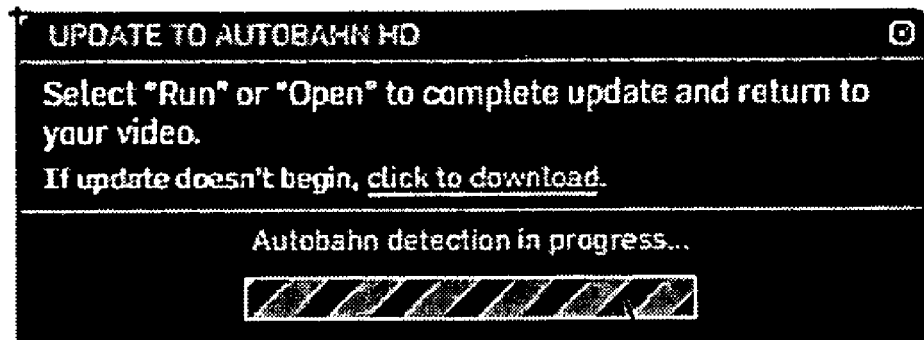
FIG. 16A is a screen illustration showing a first example of a download window.

FIG. 16A is a screen illustration showing a first example of a download window 474. Client device 346 may presents user 16 with download window 474 when user 16 selects the yes please button shown in FIGS. 15A-15C. Download window 474 presents a message that informs user 16 to "Select 'Run' or 'Open' to complete update and return to your video." Download window 474 also presents a message that "If the update doesn't being, click here to download." This message presents user 16 with the option to download in situations where the update does not being to download. Furthermore, in the example of FIG. 16A, download window 474 includes status 476. Status 476 indicates how much of plug-in module 356 has been downloaded.

Figure 16B:
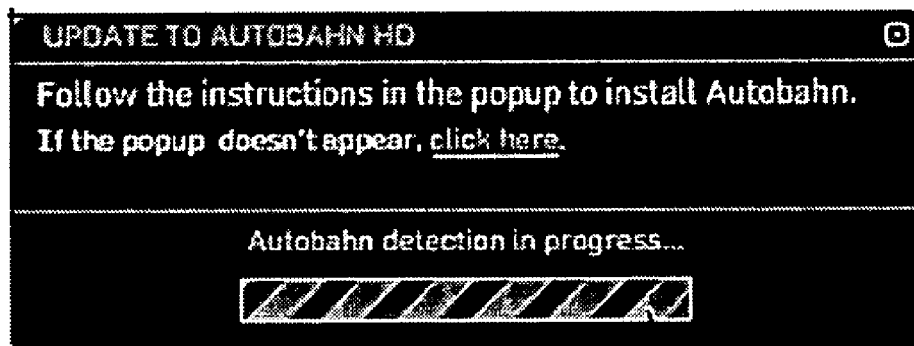
FIG. 16B is a screen illustration showing a second example of a download window.

FIG. 16B is a screen illustration showing a second example of a download window 478. Client device 346 may presents user 16 with download window 478 when user 16 selects the yes please button shown in FIGS. 15A-15C. Download window 478 presents a message that informs user 16 to "Follow the instruction in the pop-up to install Autobahn." Download window 478 also presents a message that "If the update doesn't being, click here to download." This message presents user 16 with the option to download in situations where the update does not being to download. Furthermore, in the example of FIG. 16B, download window 478 includes status 480. Status 480 indicates how much of plug-in module 356 has been downloaded.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory ("RAM") such as synchronous dynamic random access memory ("SDRAM"), read-only memory ("ROM"), non-volatile random access memory ("NVRAM"), electrically erasable programmable read-only memory ("EEPROM"), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors ("DSPs"), general purpose microprocessors, application-specific integrated circuits ("ASICs"), field programmable logic arrays ("FPGAs"), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder ("CODEC").

Various techniques have been described. For example, some of the techniques described herein relate to media players embedded within web pages. However, this should not be construed as a limitation on the techniques. Rather, other the techniques may also be applicable in other contexts, including standalone media players. These and other techniques are within the scope of the following claims.

The invention claimed is:

1. A method comprising:
   displaying media data of a media object, via a media player configured on a client device;
   determining a viewing event while displaying the media data via the media player, wherein the viewing event comprises at least one of a playback stall of the media data, a full-screen activation received from a user while displaying the media data, a skip-ahead request, a dropping of frames of the media data, a first transfer rate of the media data that is at least a defined threshold higher than a playback rate of the media data, or an end of viewing event; and
   presenting a prompt to download an executable software module in response to the determined event, wherein the executable software module enables the client device to receive additional media data in the media object at a second transfer rate, and wherein the second transfer rate is different than the first transfer rate.

2. The method of claim 1, wherein the executable software module receives at least some additional media data from a peer server when the viewing event is the playback stall.

3. The method of claim 1, wherein the executable software module downloads versions of the media data that are encoded for a lower playback rate than the first transfer rate when the viewing event is the playback stall.

4. The method of claim 1, wherein determining that the event is the playback stall comprises determining that an amount of the initial media data in a media buffer is below a given threshold.

5. The method of claim 1, wherein determining that the event is the playback stall comprises determining that the first transfer rate of the media data is less than the playback rate of the media data.

6. The method of claim 1, wherein the executable software module downloads versions of the media data that are encoded for a higher playback rate than a playback rate of a current version of media data when the viewing event is the full screen activation.

7. The method of claim 1, wherein the executable software module downloads future media data from a peer server when the viewing event is the skip-ahead request.

8. The method of claim 1, wherein the end of viewing event comprises an end of the media object or a user finishing viewing the media data.

9. A client device comprising:
   a network interface that downloads media data of a media object; and
   a media player, wherein the media player comprises:
   a media display module that displays the media data;
   at least one of a stall detection and prediction module, a full screen activation module, a skip-ahead detection module, a flame drop detection module, a rate detection module, and an end of media detection module that determines a viewing event, wherein the viewing event is at least one of a playback stall of the media data, a full-screen activation received from a user while displaying the media data, a skip-ahead request, a dropping of frames of the media data, a first transfer rate of the media data that is at least a defined threshold higher than a playback rate of the media data, or an end of viewing event; and
   an installation determination module that causes the client device to prompt to download an executable software module in response to the determined event, wherein the executable software module enables the client device to receive additional media data in the media object at a second transfer rate, and wherein the second transfer rate is different than the first transfer rate, wherein while the media player displays the media data, the stall detection and prediction module determines the occurrence of the playback stall, the full screen activation module determines a user's request for full-screen activation, the skip-ahead detection module determines the user's skip-ahead request, the flame drop detection module determines the dropping of frames of the media data, the rate detection module determines that the first transfer rate of the media data is at least the defined threshold higher than the playback rate of the media data, and the end of media detection module determines the end of viewing event.

10. The client device of claim 9, wherein the executable software module receives at least some additional media data from a peer server when the viewing event is the playback stall.

11. The client device of claim 9, wherein the executable software module downloads versions of the media data that are encoded for a lower playback rate than the first transfer rate when the viewing event is the playback stall.

12. The client device of claim 9, wherein determining that the event is the playback stall comprises determining that an amount of the initial media data in a media buffer is below a given threshold.

13. The client device claim 9, wherein the stall detection and prediction module determines that the event is the playback stall when the first transfer rate of the media data is less than the playback rate of the media data.

14. The client device of claim 9, wherein the executable software module downloads versions of the media data that are encoded for a higher playback rate than a playback rate of a current version of media data when the viewing event is the full screen activation.

15. The client device of claim 9, wherein the executable software module downloads future media data from a peer server when the viewing event is the skip-ahead request.

16. The client device of claim 9, wherein the end of viewing event comprises an end of the media object or a user finishing viewing the media data.

17. A computer-readable storage medium comprising instructions that cause one or more processors, on a client device to:
   display media data of a media object, via a media player;
   determine a viewing event while displaying the media data via the media player, wherein the viewing event comprises at least one of a playback stall, a full-screen activation received from a user while displaying the media data, a skip-ahead request, a dropping of frames of the media data, a first transfer rate of the media data that is at least a defined threshold higher than a playback rate of the media data, or an end of viewing event; and
   present a prompt to download an executable software module in response to the determined event, wherein the executable software module enables the client device to receive additional media data in the media object at a second transfer rate, and wherein the second transfer rate is different than the first transfer rate.

18. A method comprising:

receiving, with a client device, initial media data in a media object at a first rate;

presenting, with the client device, the initial media data in the media object;

automatically identifying an occurrence of a playback stall in the presentation of the initial media data;

presenting, when the occurrence of the playback stall has been identified, a prompt that requests a user of the client device to decide whether to install on the client device a software module that enables the client device to receive additional media data in the media object at a second rate, wherein the second rate is different than the first rate;

installing the software module when the user, in response to the prompt, decides to install the software module;

using the software module to receive, with the client device, the additional media data in the media object at the second rate; and presenting the additional media in the media object.

19. A device comprising:

a network interface that receives initial media data in a media object at a first rate;

a media playback module that causes the device to present the initial media data in the media object;

a stall detection module that automatically identifies a current or future occurrence of a playback stall in the presentation of the initial media data;

an installation determination module that presents, when the stall detection module identifies the occurrence of the playback stall during the presentation of the initial media data, a prompt that requests a user of the device to decide whether to install on the device a software module that enables the device to receive additional media data in the media object at a second rate, wherein the second rate is different than the first rate; and a plug-in download module that installs the software module when the user, in response to the prompt, decides to install the software module; and wherein, when installed on the device, the software module causes the network interface to receive the additional media data in the media object at the second rate; and wherein the media playback module causes the device to present the additional media in the media object.

* * * * *